(12) United States Patent
Fukuda et al.

(10) Patent No.: US 7,253,676 B2
(45) Date of Patent: Aug. 7, 2007

(54) SEMICONDUCTOR DEVICE AND DRIVING METHOD OF SEMICONDUCTOR DEVICE

(75) Inventors: Koichi Fukuda, Kanagawa (JP); Kenichi Imamiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 76 days.

(21) Appl. No.: 11/019,379

(22) Filed: Dec. 23, 2004

(65) Prior Publication Data
US 2005/0168263 A1   Aug. 4, 2005

(30) Foreign Application Priority Data
Dec. 25, 2003   (JP) .............................. 2003-429147

(51) Int. Cl.
*G05F 1/10* (2006.01)
(52) U.S. Cl. ...................... 327/536; 327/537
(58) Field of Classification Search .................... 327/5, 327/35, 536, 537, 535
See application file for complete search history.

(56) References Cited

U.S. PATENT DOCUMENTS

| | | | | |
|---|---|---|---|---|
| 5,258,662 | A | * | 11/1993 | Skovmand ................... 327/544 |
| 5,426,334 | A | * | 6/1995 | Skovmand ................... 327/427 |
| 5,574,634 | A | * | 11/1996 | Parlour et al. ................. 363/59 |
| 5,627,488 | A | | 5/1997 | Tanzawa et al. |
| 5,969,557 | A | | 10/1999 | Tanzawa et al. |
| 5,991,221 | A | * | 11/1999 | Ishikawa et al. ............. 365/226 |
| 6,294,950 | B1 | | 9/2001 | Lee et al. |
| 6,597,235 | B2 | * | 7/2003 | Choi ........................... 327/536 |
| 6,717,458 | B1 | * | 4/2004 | Potanin ....................... 327/536 |
| 6,791,212 | B2 | * | 9/2004 | Pulvirenti et al. ........... 307/113 |
| 2002/0130701 | A1 | * | 9/2002 | Kleveland .................... 327/536 |
| 2003/0080955 | A1 | * | 5/2003 | Pulvirenti et al. ........... 345/212 |
| 2004/0066225 | A1 | * | 4/2004 | Seo ............................. 327/536 |
| 2004/0239408 | A1 | * | 12/2004 | Chen et al. .................. 327/536 |
| 2005/0110560 | A1 | * | 5/2005 | Kim et al. ................... 327/536 |
| 2005/0168263 | A1 | | 8/2005 | Fukuda et al. |
| 2006/0203557 | A1 | | 9/2006 | Fukuda |

FOREIGN PATENT DOCUMENTS

| | | |
|---|---|---|
| JP | 8-190798 | 7/1996 |
| JP | 2000-173266 | 6/2000 |
| JP | 2003-242790 | 8/2003 |
| KR | 1998-070699 | 10/1998 |

OTHER PUBLICATIONS

U.S. Appl. No. 10/019,294, filed Dec. 23, 2004, Fukuda.

* cited by examiner

*Primary Examiner*—Long Nguyen
*Assistant Examiner*—Ryan C. Jager
(74) *Attorney, Agent, or Firm*—Oblon, Spivak, McClelland, Maier & Neustadt, P.C.

(57) ABSTRACT

A semiconductor device that includes a clock generator which generates a clock signal; a booster which boosts a supply voltage by using the clock signal to output the boosted voltage; a potential detector which detects an output potential of the booster to output a frequency changing signal depending on the output potential; and a frequency changer which is interposed between the clock generator and the booster to change the frequency of the clock signal from the clock generator to the booster on the basis of the frequency changing signal.

19 Claims, 13 Drawing Sheets

SEMICONDUCTOR DEVICE AND DRIVING METHOD OF SEMICONDUCTOR DEVICE

CROSS-REFERENCE TO RELATED APPLICATION

This application is based upon and claims the benefit of priority from the prior Japanese Patent Applications No. 2003-429147, filed on Dec. 25, 2003, the entire contents of which are incorporated herein by reference.

BACKGROUND OF THE INVENTION

1. Field of the Invention

The present invention relates to a semiconductor device and a driving method of a semiconductor device.

2. Background Art

Such a semiconductor memory device as a NAND type flash memory or the like requires a voltage which is higher than a power source voltage and is constant in order to write, erase or read data. For this reason, a semiconductor device is provided with a booster circuit which boosts a power source and a regulator circuit which holds an output voltage of the booster circuit in a constant voltage.

FIG. 18 shows one example of a boosted potential generating portion in a conventional semiconductor memory device 10. A clock generating circuit 11 outputs a clock signal Φ, and a booster circuit 12 boosts a power source voltage by the clock signal Φ and a reversed signal (hereinafter, called "Φb") of the clock signal Φ having phases reversed to each other.

A regulator circuit 13 is provided with resistors R1, R2, a differential amplifier AMP1, an inverter In1, and AND gates G1, G2. In a potential detecting circuit 14, the resistors R1 and R2 potential-divides an output potential Vout of the booster circuit 12 to produce a monitor potential MON, and the differential amplifier AMP1 compares the monitor potential MON with a reference potential Vref. The differential amplifier AMP1 outputs "H (High)" level, when the monitor potential MON is larger than the reference potential Vref, while it outputs "L (Low)" level, when the monitor potential MON is smaller than the reference potential Vref. An output signal from the differential amplifier AMP1 is inverted by the inverter In1, and it is inputted into one of input terminals of the AND gates G1 and G2 as a flag signal FLG. Further, the other input terminals of the AND gates G1 and G2 are respectively inputted with clock signals Φ and Φb.

When the output potential Vout is relatively low and the monitor potential MON is smaller than the reference potential Vref, the flag signal FLG is H level. Therefore, the AND gates G1 and G2 allow the clock signals Φ and Φb to pass through the booster circuit 12, so that the booster circuit 12 boosts the power source voltage. On the other hand, when the output potential Vout is relatively high and the monitor potential MON exceeds the reference potential Vref, the flag signal FLG becomes L level. Accordingly, the AND gates G1 and G2 interrupt the clock signals Φ and Φb, so that the booster circuit 12 stop its boosting operation.

Thus, the regulator circuit 13 holds the monitor potential MON in almost the reference potential Vref by allowing passing-through of the clock signals Φ and Φb or by interrupting them. Since the monitor potential MON depends on the output potential Vout, the regular circuit 13 holds the output potential Vout in about a certain constant potential. Thereby, by setting the values of the reference potential Vref and the resistors R1 and R2 properly, the regulator circuit 13 can hold the output potential in almost a predetermined expected potential value.

The above technique is described in JP-A2003-242790 (hereinafter, called Patent Literature 1), U.S. Pat. No. 6,294,950 (hereinafter, called Patent Literature 2) and JP-A08-190789 (hereinafter, called Patent Literature 3).

Now, in order to boost the output potential Vout up to a predetermined expected potential value in a short time, it is necessary to elevate a boosting ability of the booster circuit 12. When the boosting ability of the booster circuit 12 is elevated, as shown in FIG. 19, there occurs such a problem that overshoot and ripple become large. The overshoot means such a phenomenon that a potential transiently exceeds a expected potential value at a time of boosting. The ripple means such a phenomenon that, when an output potential Vout after being boosted is held in an expected potential value, the output potential Vout oscillates at an expected potential value. These phenomena occur due to RC delay from detection of the output Vout to feedback of a flag signal FLG to AND gates G1 and G2.

These problems become significant when the values of the resistors R1 and R2 are made large in order to reduce a value of a current flowing in the resistors R1 and R2, which acts a load current on the booster circuit 12. This is because, when the values of the resistors R1 and R2 are made large, the RC time constant in the potential detecting circuit 14 becomes large so that response of the potential detecting circuit 14 is delayed.

In the Patent Literature 1 and the Patent Literature 2, a semiconductor device which compares a voltage obtained by voltage-dividing an output voltage of a booster circuit with a reference voltage to change a frequency of a clock generating circuit. However, in such a flash memory as an NAND type flash memory, clock signals are ordinarily supplied to a plurality of booster circuits by one clock generating circuit. Thereby, there arises a problem that, when the frequency of the clock generating circuit itself is changed, the frequencies of all the clock signals supplied to the plurality of booster circuits change. On the other hand, when clock generating circuits are provided so as to correspond to each of the plurality of booster circuits, there occur such a problem that the size of the semiconductor memory device is made large and such a problem that the amplitude or the frequency of the clock signal is fluctuated.

SUMMARY OF THE INVENTION

A semiconductor device according to an embodiment of the present invention comprises a clock generating circuit which generates a clock signal; a booster circuit which boosts a supply voltage by using the clock signal to output the boosted voltage; a potential detecting circuit which detects an output potential of the booster circuit to output a frequency changing signal depending on the output potential; and a frequency changing circuit which is interposed between the clock generating circuit and the booster circuit to change the frequency of the clock signal from the clock generating circuit to the booster circuit on the basis of the frequency changing signal.

A driving method of a semiconductor device according to an embodiment of the present invention, said semiconductor device including a clock generating circuit generating a clock signal, a booster circuit boosting a supply voltage using the clock signal to output the boosted voltage, a potential detecting circuit connected to an output of the boosting circuit, and a frequency changing circuit interposed between the clock generating circuit and the booster circuit, comprises:

detecting an output potential of the booster circuit at the potential detecting circuit; generating a frequency changing signal depending on the output potential at the potential detecting circuit; changing a frequency of the clock signal from clock generating circuit to the booster circuit on the basis of the frequency changing signal.

DETAILED DESCRIPTION OF THE INVENTION

Embodiments of the present invention will be explained below with reference to the drawings. However, these embodiments do not limit the present invention. The semiconductor devices according to these embodiments is each provided between a clock generating circuit and a booster circuit with a frequency changing circuit for changing the frequency of a clock signal. Thereby, even if a boosting ability of the booster circuit is improved, overshoot and ripple of an output voltage can be reduced.

FIRST EMBODIMENT

Figure 1:
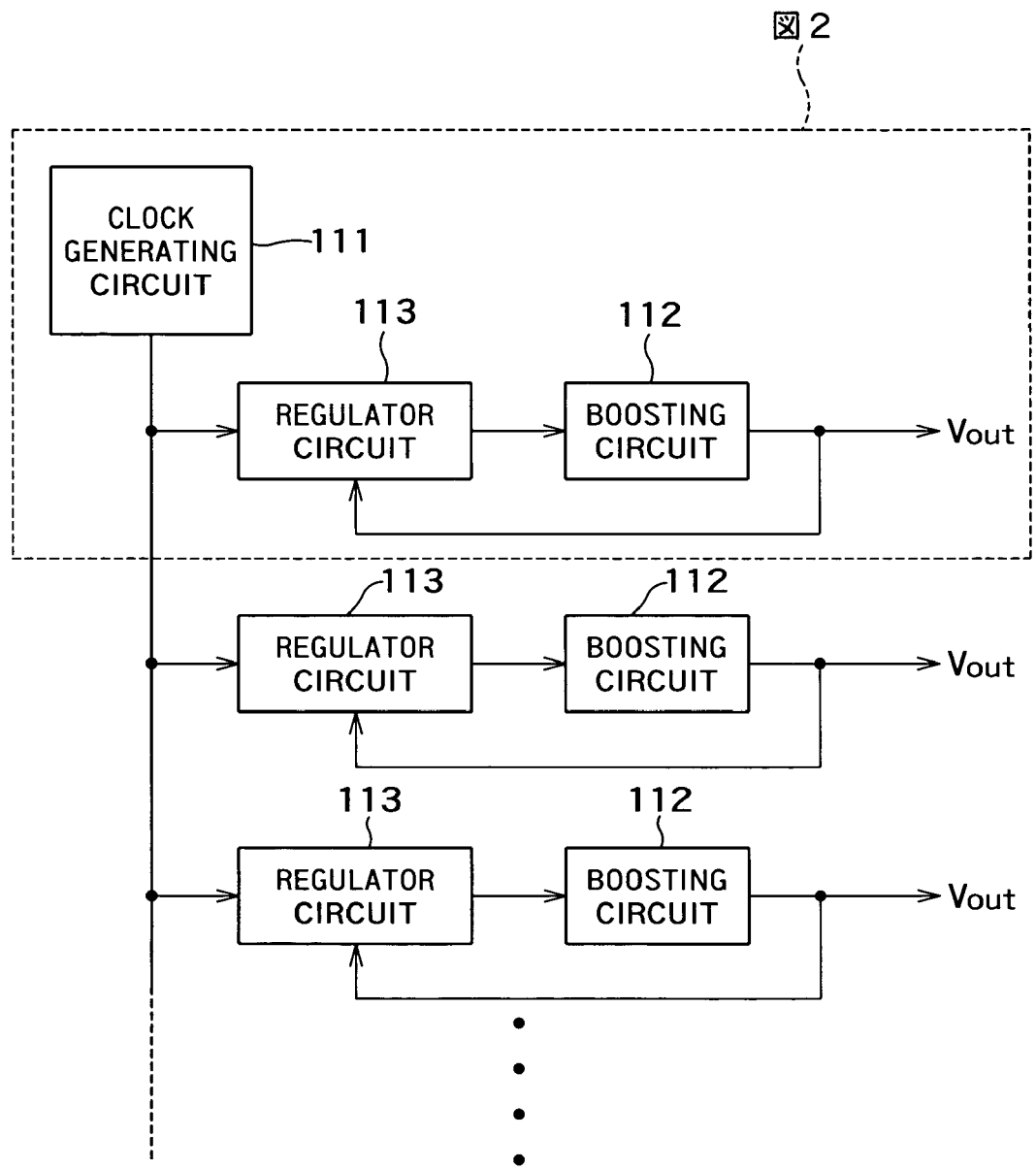
FIG. 1 is a bock diagram of a boosted potential generating section of a semiconductor device 100 according to a first embodiment of the present invention.

FIG. 1 is a block diagram of a boosted potential generating section of a semiconductor device 100 according to a first embodiment of the present invention. The semiconductor device 100 is provided with a clock generating circuit 111, booster circuits 112 and regulator circuits 113. Thus, a plurality of the booster circuits 112 are provided to correspond to one clock generating circuit 111. The regulator circuit 113 is provided between each booster circuit 112 and the clock generating circuit 111 so as to correspond to each booster circuit 112. The clock generating circuit 111 may be constituted of an oscillator such as, for example, a ring oscillator. The booster circuit 112 may be a charge pump of Dickson type such as, for example, shown in FIG. 5.

The clock generating circuit 111 generates a clock signal. The booster circuit 112 boosts a supply voltage using the clock signal and further outputs the boosted supply voltage. The regulator circuit 113 detects an output potential Vout of the booster circuit 112 to perform switching between passing-through and interruption of the clock signal from the clock generating circuit 111 through the booster circuit 112 on the basis of the detected output signal Vout and adjust the frequency of the clock signal. Thereby, the regulator circuit 113 holds the output potential Vout in a desired expected voltage value.

The plurality of booster circuits 112 are provided for each clock generating circuit 111. As a representative one of such semiconductor devices, there is a NAND type flash memory. In the NAND type flash memory, an output voltage Vout is used for writing data in a memory cell, erasing the same or reading data from the memory cell.

Figure 2:
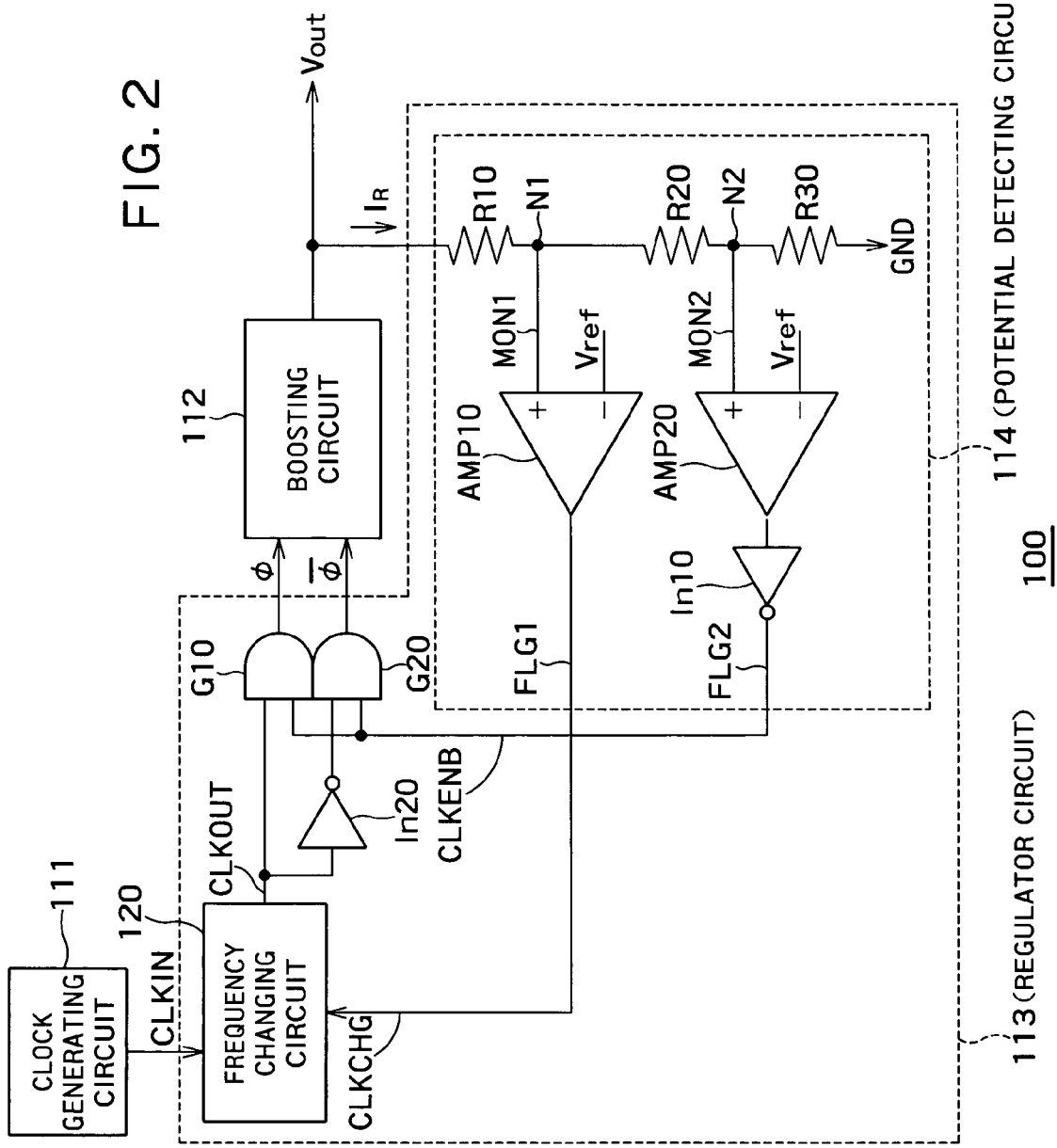
FIG. 2 is a circuit diagram showing a clock generating circuit 111, one of booster circuits 112 and one of regulator circuits 113.

FIG. 2 is a circuit diagram showing the clock generating circuit 111, and respective ones of the booster circuits 112 and the regular circuits 113. A portion defined with a broken line in FIG. 1 corresponds to a portion shown in FIG. 2. The regulator circuit 113 includes resistors R10, R20 and R30, differential amplifiers AMP10 and AMP20, a frequency changing circuit 120, AND gates G10 and G20, and inverters In10 and In20.

The resistors R10, R20 and R30 are connected in series between an output of the booster circuit 112 and a ground GND. The resistors R10, R20 and R30 may be fixed resistors or variable resistors. The resistors R10, R20 and R30 potential-divide the output voltage Vout to produce a monitor potential MON1 from a node N1 between the resistor R10 and the resistor R20 and a monitor potential MON2 from a node N2 between the resistor R20 and R30, respectively. Since the monitor potentials MON1 and MON2 changes in proportion to the output potential Vout, the output potential Vout can be monitored.

In order to reduce a current $I_R$ flowing in the resistors R1, R2 and R3, it is preferable that the sum of resistance values of the resistors R1, R2 and R3 is made larger. This is because that the current $I_R$ acts as a load current for blocking a boosting operation of the booster circuit 112. However, the resistance values of the resistors R1, R2 and R3 are large, a RC time constant of the potential detecting circuit 114 becomes large, so that response of the potential detecting circuit 114 is delayed.

One inputs of the differential amplifiers AMP10 and AMP20 are respectively connected to nodes N1 and N2, while the other inputs thereof are both connected to a reference potential Vref. The differential amplifier AMP10 compares the monitor potential MON1 with the reference potential Vref to outputs a flag signal FLG1 on the basis of the comparison result. In details, when the monitor potential MON1 is lower than the reference potential Vref, the differential amplifier AMP10 makes the flag signal FLG1 L (Low), and when the monitor potential MON1 exceeds the reference potential Vref, the differential amplifier AMP10 makes the flag signal FLG1H (High).

The differential amplifier AMP20 compares the monitor potential MON2 with the reference potential Vref to output a signal on the basis of the comparison result. Since an output of the differential amplifier AMP20 is connected with the inverter In10, a flag signal FLG2 is a signal obtained by reversing an output signal of the differential amplifier AMP20. In details, when the monitor potential MON2 is lower than the reference potential Vref, the differential amplifier AMP20 outputs Low and the flag signal FLG 2 becomes High. When the monitor potential MON2 exceeds the reference potential Vref, the differential amplifier AMP20 outputs High and the flag signal FLG2 becomes Low.

The frequency changing circuit 120 is connected between the clock generating circuit 111 and the booster circuit 112. The frequency changing circuit 120 is inputted with a clock input signal CLKIN from the clock generating circuit 111 and is inputted with the flag signal FLG1 from the differential amplifier AMP10 as a frequency changing signal CLKCHG. The frequency changing circuit 120 changes the frequency of the clock input signal CLKIN on the basis of the frequency changing signal CLKCHG. For example, when the frequency changing signal CLKCHG is inactive (Low), namely, the flag signal FLG1 is low, the frequency changing circuit 120 outputs the clock input signal CLKIN as a clock output signal CLKOUT without changing the frequency "w" of the clock input signal CLKIN. When the frequency changing signal CLKCHG is active (High), namely, the flag signal FLG1 is high, the frequency changing circuit 120 lowers the frequency w of the clock input signal CLKIN to w/2 and outputs this signal as the clock output signal CLKOUT.

The AND gates G10 and G20 is connected between the frequency changing circuit 120 and the booster circuit 112. One input terminal of the AND gate G10 is inputted with the flag signal FLG2 as an enabling signal CLKENB, and the other input terminal of thereof is inputted with the clock output signal CLKOUT. Thereby, when the enabling signal CLKENB is active (High), namely, the flag signal FLG2 is high, the AND gate G10 allows passing-through of the clock output signal CLKOUT as a clock signal Φ. When the enabling signal CLKENB is inactive (Low), namely, the flag signal FLG2 is low, the AND gate G10 interrupts the clock output signal CLKOUT. One input of the AND gate G20 is inputted with the flag signal FLG2 as an enabling signal CLKENB and the other input thereof is inputted with a reversed signal of the clock output signal CLKOUT. Thereby, when the enabling signal CLKENB is active (High), the AND gate G20 allows passing-through of the reversed signal of the clock output signal CLKOUT as a clock signal Φbar. When the enabling signal CLKENB is inactive (Low), the AND gate G10 interrupts the reversed signal of the clock output signal CLKOUT.

The monitor potential MON2 is lower than the monitor potential MON1 by the magnitude corresponding to interposition of the resistor R20. Thereby, for example, when the output potential Vout increases from zero, the monitor potential MON1 first exceeds the reference potential Vref and then the monitor potential MON2 exceeds the reference potential Vref. Therefore, from a state (state 1) that the flag signal FLG1 is Low and the flag signal FRG2 is High, the flag signal FLG1 is changed to High (state 2) and the flag signal FRG2 is further changed to Low (state 3).

At a time of the state 1, the frequency changing signal CLKCHG is inactive and the enabling signal CLKENB is active. Therefore, the frequency changing circuit 120 outputs the clock input signal CLKIN with the frequency "w" as the clock output signal CLKOUT, and the AND gates G10 and G20 output the clock output signals CLKOUT as clock signals Φ and Φbar.

At a time of the state 2, both the frequency changing signal CLKCHG and the enabling signal CLKENB are active. Therefore, the frequency changing circuit 120 outputs a clock signal 2*CLK obtained by reducing the frequency w of the clock input signal CLKIN to w/2 as the clock output signal CLKOUT, and the AND gates G10 and G20 output the clock signal 2*CLK as the clock signals Φ and Φbar.

At a time of the state 3, the frequency changing signal CLKCHG is active and the enabling signal CLKENB becomes inactive. Therefore, the frequency changing circuit 120 outputs the clock signal 2*CLK, but the AND gates G10 and G20 interrupt the clock signal 2*CLK.

On the other hand, when the output potential Vout falls below High (H) potential, the monitor potential MON2 first lowers below the reference potential Vref, and the monitor potential MON1 lowers below the reference potential Vref. Therefore, from a state (the state 3) that the flag signal FLG1 is High and the flag signal FRG2 is Low, the flag signal FLG2 first changes to High (the state 2) and further the flag signal FLG1 becomes Low (the state 1).

Figure 3:
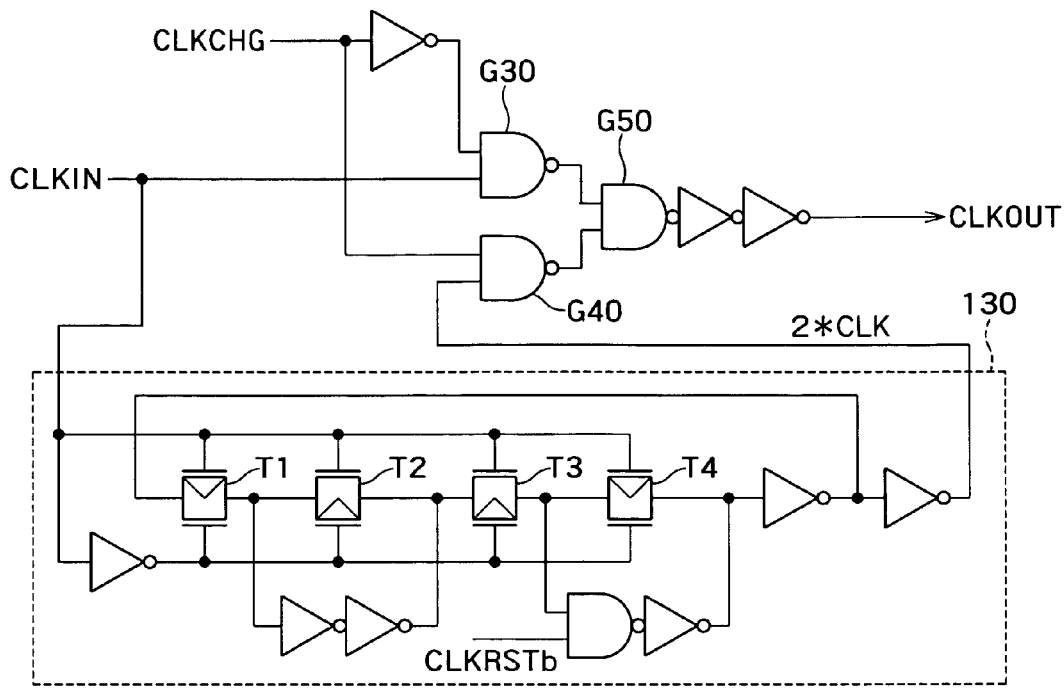
FIG. 3 is a circuit diagram showing a specific example of a frequency changing circuit 120.

FIG. 3 is a circuit diagram showing a specific example of the frequency changing circuit 120. The frequency changing circuit 120 is provided with a frequency-dividing circuit 130 which divides the frequency w of the clock input signal CLKIN into w/2 to output this frequency-divided signal as the clock signal 2*CLK. The frequency-dividing circuit 130 includes transfer gates T1 to T4, as shown in FIG. 3. The frequency w of clock input signal CLKIN can be frequency-divided into w/2 by alternate switching between the transfer gates T1 and T4 and the transfer gates T2 and T3. The transfer gates T1 to T4 are, for example, respectively constituted by parallel connections of N-type MOS transistors and P-type MOS transistors.

The frequency changing circuit 120 is further provided with NAND gates G30, G40 and G50. The NAND gate G30 is inputted with the reversed signal of the frequency changing signal CLKCHG and the clock input signal CLKIN. The NAND gate G40 is inputted with the frequency changing signal CLKCHG and the clock signal 2*CLK from the frequency-dividing circuit 130. The NAND gate G50 is inputted with outputs of the NAND gates G30 and G40.

Therefore, when the frequency changing signal CLKCHG is inactive (Low), the clock output signal CLKOUT becomes the clock input signal CLKIN with the frequency w. On the other hand, when the frequency changing signal CLKCHG is active (High), the clock output signal CLKOUT becomes the clock signal 2*CLK obtained by frequency-dividing the frequency w of the clock input signal CLKIN into w/2.

Figure 4:
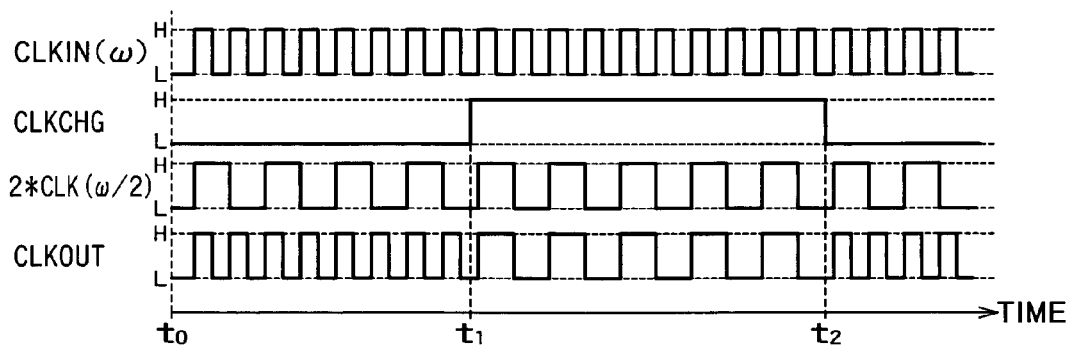
FIG. 4 is a timing chart showing a relationship between a frequency changing signal CLKCHG and a clock output signal CLKOUT.

FIG. 4 is a timing chart showing a relationship between the frequency changing signal CLKCHG and the clock output signal CLKOUT. When the frequency changing signal CLKCHG is Low (time points $t_0$ to $t_1$), the clock output signal CLKOUT is the clock input signal CLKIN. When the frequency changing signal CLKCHG becomes High (time points $t_1$ to $t_2$), the clock output signal CLKOUT becomes the clock signal 2*CLK. Further, the frequency changing signal CLKCHG returns to Low (time point $t_2$ and thereafter), the clock output signal CLKOUT returns to the clock input signal CLKIN.

Figure 5:
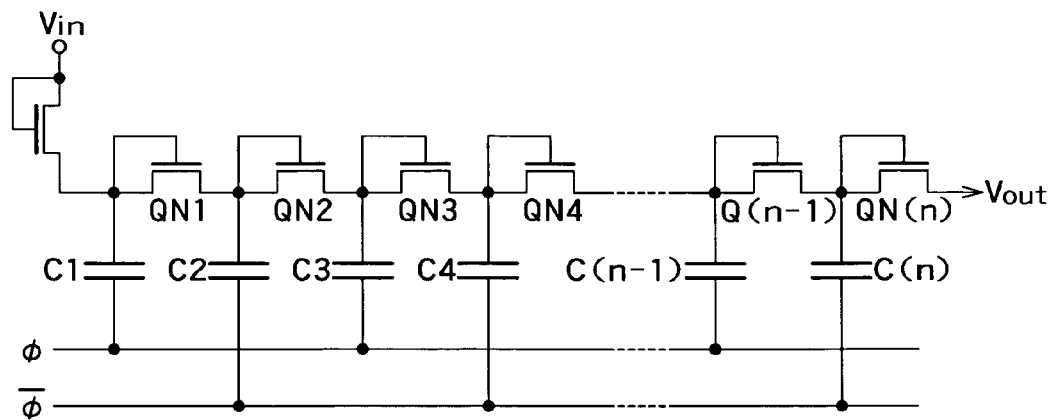
FIG. 5 is a circuit diagram showing a specific example of the booster circuit 112.
Figure 6:
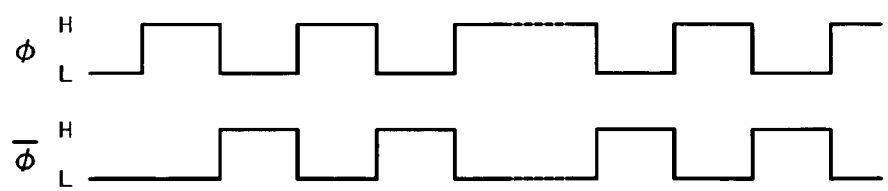
FIG. 6 is a timing chart showing signal levels of clock signals Φ and Φbar.

FIG. 5 is a circuit diagram showing a specific example of the booster circuit 112. FIG. 6 is a timing chart showing signal levels of clock signals Φ and Φbar. The booster circuit 112 is inputted with a supply potential Vin, and it boosts the supply potential Vin by the clock signals Φ and Φbar whose phases are reversed to each other, as shown in FIG. 6. The booster circuit 112 outputs the boosted supply potential Vin as an output potential Vout.

Figure 7:
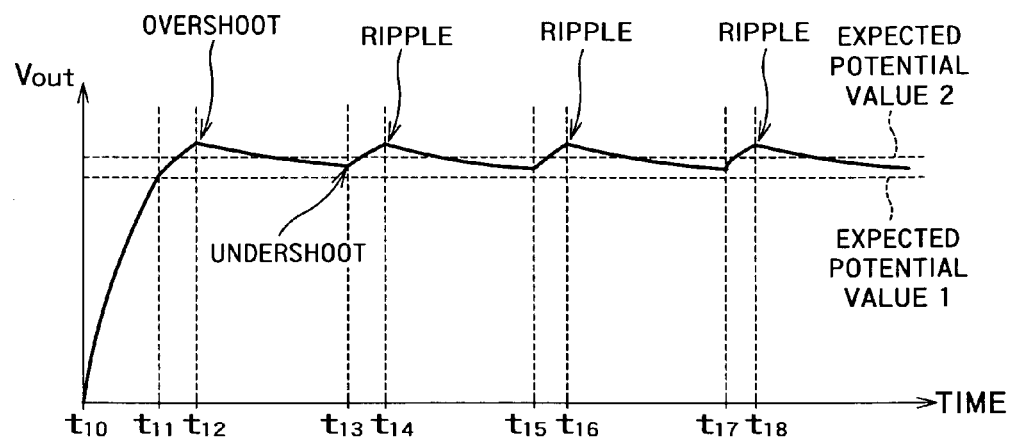
FIG. 7 is a graph showing an output potential Vout of the first embodiment.
Figure 8:
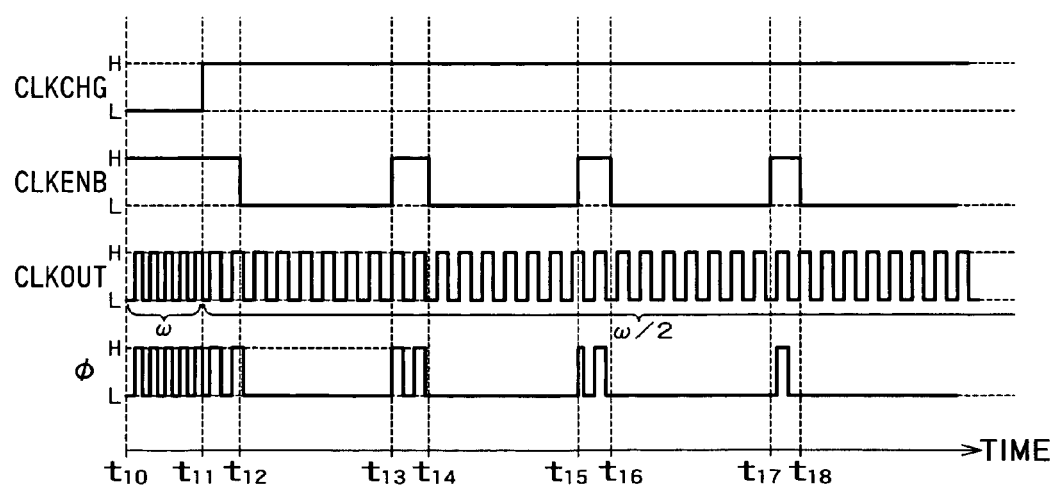
FIG. 8 is a timing chart showing a relationship among a frequency changing signal CLKCHG, an enabling signal CLKENB, a clock output signal CLKOUT and a clock signal Φ.

FIG. 7 is a graph showing an output potential Vout of this embodiment. FIG. 8 is a timing chart showing a relationship among a frequency changing signal CLKCHG, an enabling signal CLKENB, a clock output signal CLKOUT and a clock signal Φ. In this connection, since the clock input signal CLKIN and the clock signal 2*CLK are respective signals with fixed frequencies of w and w/2, as illustrated in FIG. 4, they will be omitted in FIG. 8.

The output potential Vout when the monitor potential MON1 is equal to the reference potential Vref is defined as an expected potential value 1, and the output potential Vout when the monitor potential MON2 is equal to the reference potential Vref is defined as an expected potential value 2. As described with reference to FIG. 2, when the output potential Vout is raised, since the monitor potential MON1 exceeds the reference potential Vref prior to the monitor potential MON2, the expected potential value 2 becomes a potential higher than the expected potential value 1.

With reference to FIG. 7 and FIG. 8, operation and advantage of the semiconductor device 100 shown in FIG. 2 will be explained. In this connection, this embodiment serves so as to hold the output potential Vout in the expected potential value 2.

First, when the booster circuit 112 starts boosting operation, the output potential Vout rises from zero (time points $t_{10}$ to $t_{11}$). At this time, since both the monitor potential MON1 and the monitor potential MON2 are smaller than the reference potential Vref, the frequency changing signal CLKCHG (flag signal FLG1) is Low and the enabling signal CLKENB (flag signal FLG2) is active (High). Therefore, the frequency changing circuit 120 outputs the clock input signal CLKIN as the clock output signal CLKOUT without changing the frequency w of the clock input signal CLKIN. Further, the AND gates G10 and G20 output the clock output signals CLKOUT as the clock signals Φ and Φbar. Thereby, the booster circuit 112 can boost a supply voltage (not shown) in a short time.

Next, when the output potential Vout exceeds the expected potential value 1 (time point $t_{11}$), the monitor potential MON1 exceeds the reference potential Vref and the monitor potential MON2 remains smaller than the reference potential Vref. Therefore, the frequency changing signal CLKCHG becomes active (High) and the enabling signal CLKENB holds its active (High) state. Thereby, the frequency changing circuit 120 frequency-divides the frequency w of the clock input signal CLKIN to w/2 to output the same as the clock output signal CLKOUT. The AND gates G10 and G20 output the clock output signals CLKOUT with the frequency w/2 as the clock signal Φ or Φbar. Accordingly, the boosting ability of the booster circuit 112 is reduced to ½ to the clock signals Φ and Φbar with the frequency w.

Next, when the output potential Vout exceeds the expected potential value 2 (time point $t_{12}$), the monitor potential MON2 exceeds the reference potential Vref. Therefore, the enabling signal CLKENB becomes inactive (Low). Thereby, the AND gates G10 and G20 interrupt the clock output signals CLKOUT. Thereby, the clock signals Φ and Φbar become low. That is, the boosting operation of the booster circuit 112 stops and the output potential Vout gradually lowers due to the current $I_R$. In this connection, after the output potential (voltage) Vout exceeds the expected potential value 2, it is delayed, so that the enabling signal CLKENB is changed. This is because the potential detecting circuit 114 has a RC time constant, and the RC delay of the potential detecting circuit 114 causes overshoot or ripple.

Further, when the output potential Vout lowers below the expected potential value 2 (time point $t_{13}$), the monitor potential MON2 decreases below the reference potential Vref. Thereby, the enabling potential CLKENB becomes active (High). At this time, the frequency changing signal CLKCHG holds its active (High) state. Therefore, the frequency changing circuit 120 outputs the clock signal CLKOUT with the frequency w/2 CLKOUT, and the AND gates G10 and G20 output the clock signals CLKOUT with the frequency w/2 CLKOUT as the clock signal Φ or Φbar. Accordingly, the booster circuit 112 restarts the boosting operation. However, since the frequency of the clock signal Φ or Φbar is w/2, the boosting ability of the booster circuit is about one half to the boosting ability obtained by the clock signal Φ or Φbar with the frequency w. Incidentally, since the current $I_R$ is very small, a lowering speed of the output potential Vout is slow. Thereby, the undershoot ordinarily becomes smaller than the overshoot. Accordingly, the output potential Vout does not lower below the expected potential value 1 and it is held in the expected potential value 2.

Thereafter, when the output potential Vout exceeds the expected potential value 2 (time $t_{14}$), the same operation as that at the time point $t_{12}$ is conducted in this embodiment. The operations of the semiconductor device 100 at the time points $t_{13}$ and $t_{14}$ are repeated at time points $t_{15}$ and $t_{16}$ and time points $t_{17}$ and $t_{18}$. Thereby, the semiconductor device 100 serves so as to hold the output potential Vout in the expected potential value 2.

When the output of the booster circuit 112 is connected with a new load (not shown), there occurs a possibility that the output potential Vout lowers rapidly. In such a case, since the output potential Vout lowers below the expected potential value 1, the booster circuit 112 is driven by the clock signals Φ and Φbar with the frequency w like the case at the time points $t_{10}$ to $t_{11}$. Thereby, the booster circuit 112 can boost the output voltage (potential) Vout in a short time by a High boosting ability thereof.

According to this embodiment, since the booster circuit 112 is driven by the clock signals Φ and Φbar with the frequency "w" in an initial stage of the boosting operation, the boosting speed of the output potential Vout is fast. On the other hand, when the output potential Vout is boosted up to approximately the expected potential value 2, the frequencies of the clock signals Φ and Φbar are frequency-divided to w/2. Thereby, since the boosting ability of the booster circuit 112 lowers, the overshoot can be suppressed to a smaller value as compared with the conventional case.

Further, when the output potential Vout is held in an expected potential value 2, booster circuits 112 repeats the boosting operation and stopping operation of the boosting operation by the clock signals Φ and Φbar frequency-divided to w/2.

In this embodiment, because the regulator circuit 113 changes the frequency of the clock signal for each of the booster circuits 112, the regulator circuit 113 are respectively provided so as to correspond to the plurality of booster circuits 112 (refer to FIG. 1). Thereby, the plurality of booster circuits 112 can be driven by using clock signals from the same or one clock generating circuit 111.

In this embodiment, the frequency changing circuit 120 must be provided for each of the booster circuits 112. However, the frequency changing circuit 120 can be realized with a simple frequency-dividing circuit, such as shown in FIG. 3. Further, the frequency changing circuit 120 only frequency-divides the clock signal. Therefore, fluctuation of the amplitude or frequency of the clock signal due to process variations or the like can be relatively small without making the size of the semiconductor memory device significantly large.

On the other hand, according to a conventional semiconductor device described in Patent Literature 2 and the like, a clock generating circuit must be provided for each booster circuit in order to change the frequency of the clock signal. Since the clock generating circuit is complicated as compared with the frequency changing circuit 120 according to this embodiment, provision of the clock generating circuit for each booster circuit makes the size of the semiconductor device large. Further, there is a case that the clock generating circuit is provided with a circuit which trims a clock frequency using a fuse or the like in order to suppress fluctuation of the clock frequency. In this case, when the clock generating circuit is provided for each booster circuit, the semiconductor memory device becomes complicated and its size becomes large.

In this embodiment, the frequency changing circuit 120 frequency-divides the frequency of the clock input signal CLKIN to ½. However, the frequency changing circuit 120 shown in FIG. 3 is only one specific example, and the frequency changing circuit 120 may divide the frequency of the clock input signal CLKIN to n/m of the frequency. Incidentally, n and m are natural numbers, where n<m.

In order to adjust the expected potential value 1 and the expected potential value 2, the values of the resistors R10, R20 and R30 may be changed. Thereby, the expected potential value 1 or the expected potential value 2 can be fitted to a required specification of the semiconductor memory device. The expected potential value 1 may be lower than the expected potential value 2, and it is not limited to a specific value. However, in order to reduce overshoot or ripple while holding a high boosting ability, it is preferable that the expected potential value 1 is set such that the output potential Vout does not become lower than the expected potential value 1, and it is preferable that the expected potential value 1 approximates to the expected potential value 2, when holding the output potential Vout in approximately the expected potential value 2.

SECOND EMBODIMENT

A block diagram of a boosting section of a semiconductor device 200 according to a second embodiment is similar to that in FIG. 1. In this embodiment, a regulator circuit 213 is provided in place of the regulator circuit 113.

Figure 9:
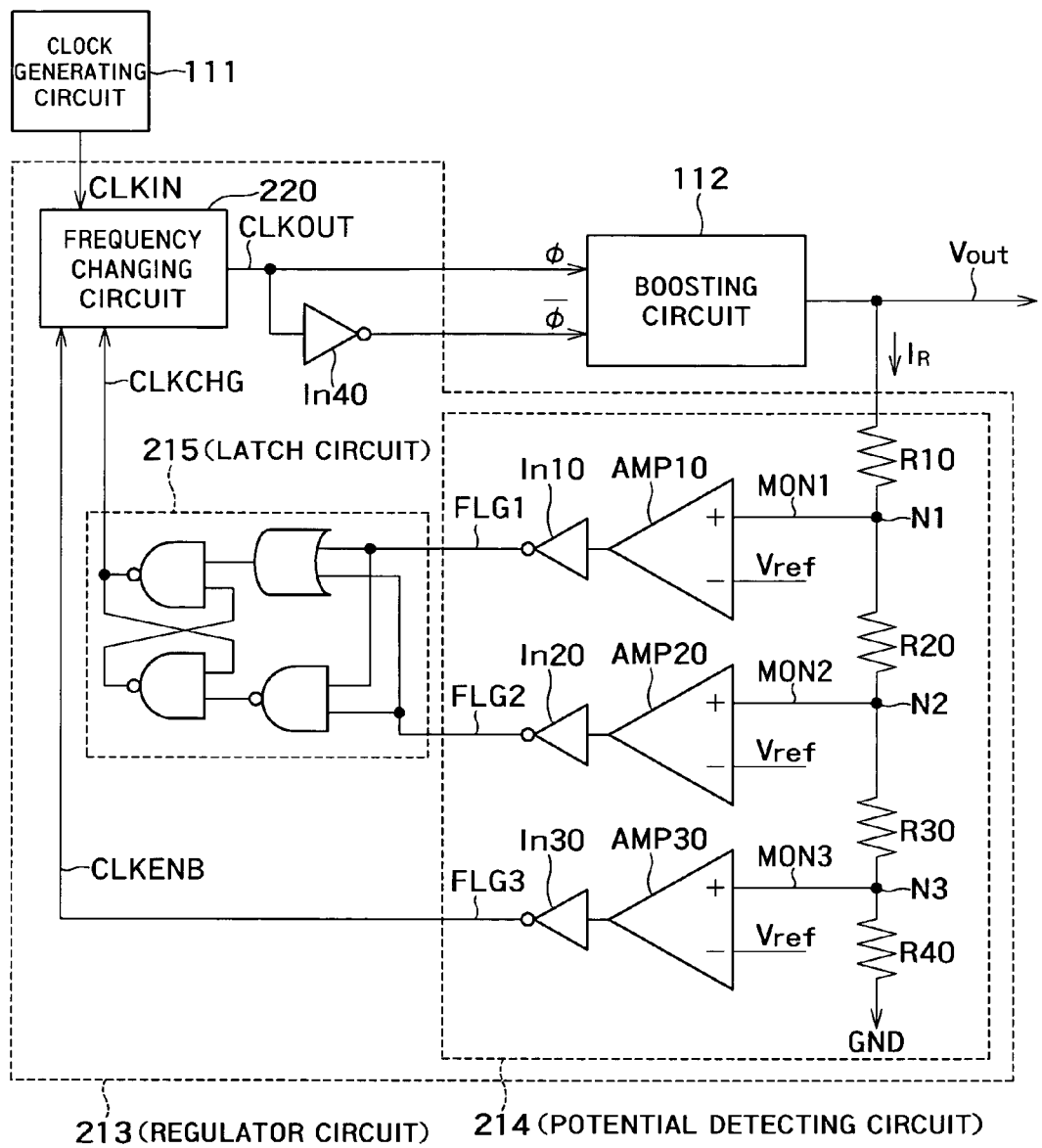
FIG. 9 is a circuit diagram showing a clock generating circuit 111, one of booster circuits 112 and one of regulator circuits 213 according to a second embodiment.

FIG. 9 is a circuit diagram showing a clock generating circuit 111, one of booster circuits 112 and one of regulator circuit 213.

The regulator circuit 213 includes resistor s R10, R20, R30 and R40, differential amplifiers AMP10, AMP20 and AMP30, a frequency changing circuit 220, a latch circuit 215, and inverters In10, In20, In30 and In40.

The resistors R10, R20, R30 and R40 are connected in series between an output of the booster circuit 112 and the ground GND. The resistors R10, R20, R30 and R40 may be either fixed resistors or variable resistors. The resistors R10, R20, R30 and R40 potential-divides the output potential Vout to produce a monitor potential MON1 from a node N1 between the resistor R10 and the resistor R20, a monitor potential MON2 from a node N2 between the resistors R20 and the resistor R30, and a monitor potential MON3 from a node N3 between the resistor R30 and the resistor R40, respectively. Since the monitor potentials MON1, MON2 and MON3 change in proportion to the output potential Vout, the output potential Vout can be monitored.

One inputs of the differential amplifiers AMP10, AMP20 and AMP30 are respectively connected to the nodes N1, N2 and N3, and the other inputs thereof are connected to the reference potential Vref. Outputs of the differential amplifiers AMP10, AMP20 and AMP30 are respectively connected with the inverters In10, In20 and In30.

The differential amplifiers AMP10, AMP20 and AMP30 respectively compare the monitor potentials MON1, MON2 and MON3 with the reference potential Vref to output signals based upon the comparison results. The inverters In10, In20 and In30 reverse respective outputs of the differential amplifiers AMP10, AMP20 and AMP30 and output these reversed outputs as flag signals FLG1, FLG2 and FLG2.

In details, when the monitor potentials MON1, MON2 and MON3 are lower than the reference potential Vref, the flag signals FLG1, FLG2 and FLG3 become High, respectively. When the monitor potentials MON1, MON2 and MON3 exceed the reference potential Vref, the flag signals FLG1, FLG2 and FLG3 become Low, respectively.

The flag signals FLG1 and FLG2 are supplied to the latch circuit 215. The latch circuit 215 outputs a frequency changing signal CLKCHG on the basis of the flag signals FLG1 and FLG2. In this embodiment, when the flag signals FLG1 and FLG2 are changed to low, the frequency changing signal CLKCHG is latched to an active (High) state. When both the flag signals FLG1 and FLG2 are changed to Low, the frequency changing signal CLKCHG is latched to an inactive (Low) state. When only one of the flag signals FLG1 and FLG2 is changed, the state of the frequency changing signal CLKCHG does not change.

The flag signal FLG3 is supplied to the frequency changing circuit 220 as an enabling signal CLKENB.

The frequency changing circuit 220 is connected between the clock generating circuit 111 and the booster circuit 112. The frequency changing circuit 220 is inputted with a clock input signal CLKIN, a frequency changing signal CLKCHG and an enabling signal CLKENB. The frequency changing circuit 220 changes the frequency of the clock input signal CLKIN on the basis of the frequency changing signal CLKCHG. Further, the frequency changing signal 220 allows passing-through of the clock input signal CLKIN or interrupts the clock input signal CLKIN on the basis of the enabling signal CLKENB.

An operation of the frequency changing circuit 220 to the flag signals FLG1, FLG2 and FLG3 will be explained. When the output potential Vout is boosted from a low potential, the monitor potentials MON1, MON2 and MON3 exceed the reference potential Vref in the order of the monitor potentials MON1, MON2 and MON3. Therefore, the flag signals FLG1, FLG2 and FLG3 sequentially change from respective High, High and High states (state 10) to Low, High and High states (state 11), Low, Low and High states (state 12), and Low, Low and Low states (state 13).

During the state 10, the frequency changing signal CLKCHG is inactive (Low) and the enabling signal CLKENB becomes active (High). At this time, the frequency changing circuit 220 outputs the clock input signal CLKIN as the clock output signal CLKOUT without changing the frequency w of outputs the clock input signal CLKIN.

During the state 11, since the frequency changing circuit 220 and the latch circuit 215 do not change, the state 11 is similar to the state 10.

During the state 12, the latch circuit 215 latches the frequency changing signal CLKCHG in an active (High) and the enabling signal CLKENB holds its active (High) state. At this time, the frequency changing circuit 220 changes the clock input signal CLKIN to a clock signal 4*CLK with a frequency of w/4 to output the same as a clock output signal CLKOUT.

During the state 13, the frequency switching signal CLKCHG is active (High) and the enabling signal CLKENB becomes inactive (Low). At this time, the frequency switching circuit 220 interrupts the clock input signal CLKIN and the clock signal 4*CLK.

In case that the output potential Vout falls below a high potential, the monitor potentials MON3, MON2 and MON1 lower below the reference potential Vref in this order. Therefore, the flag signals FLG1, FLG2 and FLG3 transit from the state 13 to the state 12, the state 11 and the state 10. In this connection, when both the flag signals FLG1 and FLG2 change, namely, the state transit from the state 11 to the state 10, the latch circuit 215 changes the frequency changing signal CLKCHG.

Figure 10:
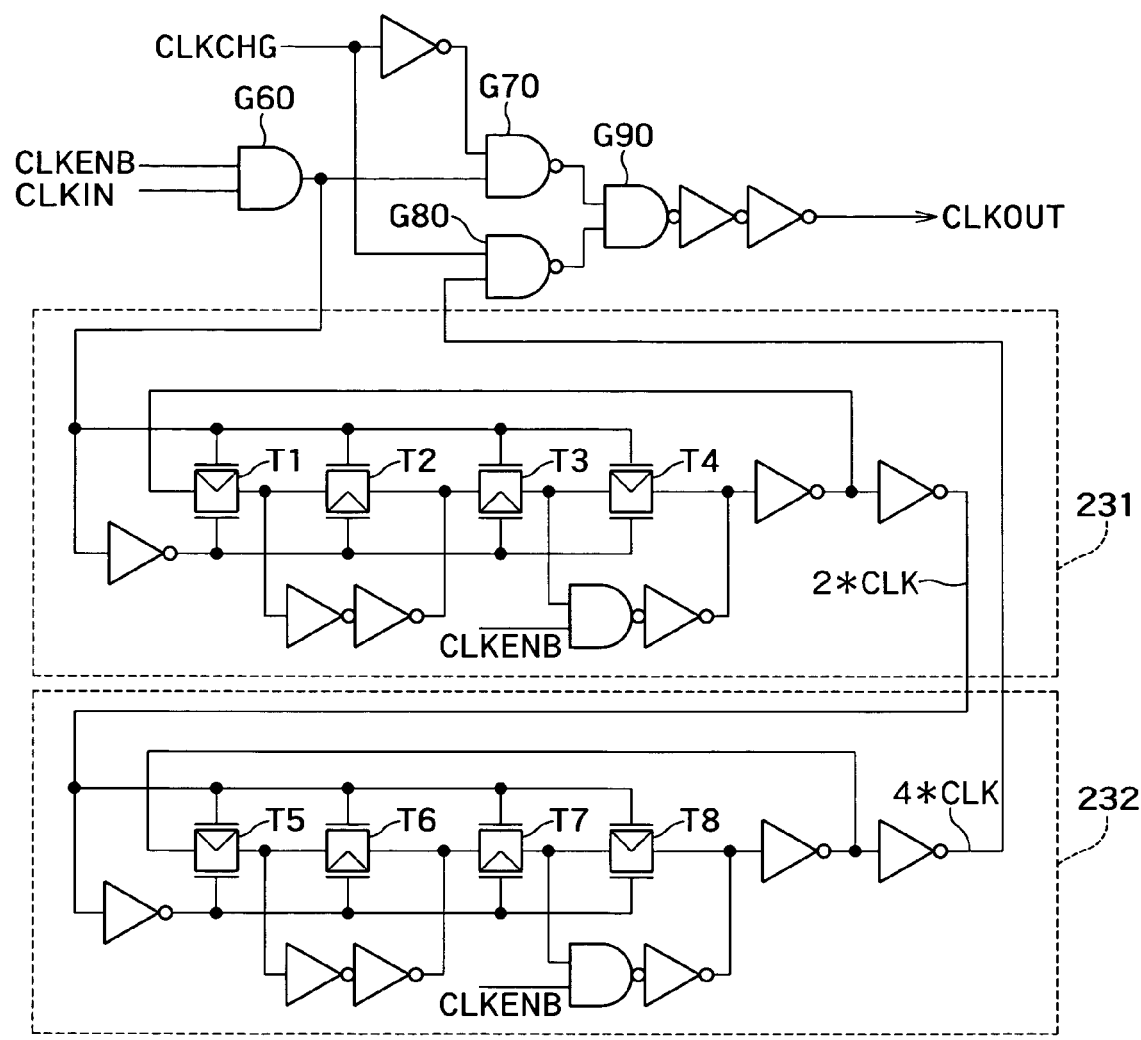
FIG. 10 is a circuit diagram showing a specific example of a frequency changing circuit 220.

FIG. 10 is a circuit diagram showing a specific example of the frequency changing circuit 220. The frequency changing circuit 220 is provided with frequency-dividing circuits 231 and 232. The frequency-dividing circuit 231 frequency-divides the frequency w of the clock input signal CLKIN to w/2 to output the same as a clock signal 2*CLK. The frequency-dividing circuit 232 frequency-divides the frequency w/2 of the clock signal 2*CLK to w/4 to output the same as a clock signal 4*CLK.

The frequency-dividing circuit 231 includes transfer gates T1 to T4. The frequency w of the clock input signal CLKIN can be frequency-divided to ½ by switching the transfer gates T1, T4 and the transfer gates T2, T3 alternately. The frequency-dividing circuit 232 includes transfer gates T5 to T8. The frequency of the clock signal 2*CLK can be further frequency-divided to ½ thereof by alternately switching the transfer gates T5, T8 and the transfer gates T6, T7. The transfer gates T5, T8 are respectively constituted by parallel connections of N-type MOS transistors and P-type MOS transistors.

The frequency changing circuit 220 is further provided with an AND gate G60, and NAND gates G70, G80 and G90. The AND gate G60 is inputted with a clock input signal CLKIN and an enabling signal CLKENB. The NAND gate G70 is inputted with an output of the NAND gate G60 and a reversed signal of a frequency changing signal CLKCHG. The NAND gate G80 is inputted with the frequency changing signal CLKCHG and a clock signal 4*CLK from the frequency-dividing circuit 232. The NAND gate G90 is inputted with outputs of the NAND gates G70 and G80.

The AND gate G60 allows passing-through of a clock input signal CLKIN, when the enabling signal CLKENB is active (High), while it interrupts the clock input signal CLKIN, when the enabling signal CLKENB is inactive (Low). Incidentally, in this embodiment, the AND gate G60 is included in the frequency changing circuit 220 as a gate circuit for allowing a clock input signal CLKIN to pass through or interrupts the same.

Further, when the frequency changing signal CLKCHG is active (High), the clock output signal CLKOUT becomes a clock signal 4*CLK. On the other hand, when the frequency changing signal CLKCHG is inactive (Low), the clock output signal CLKOUT becomes an output signal of the AND gate G60.

Figure 11:
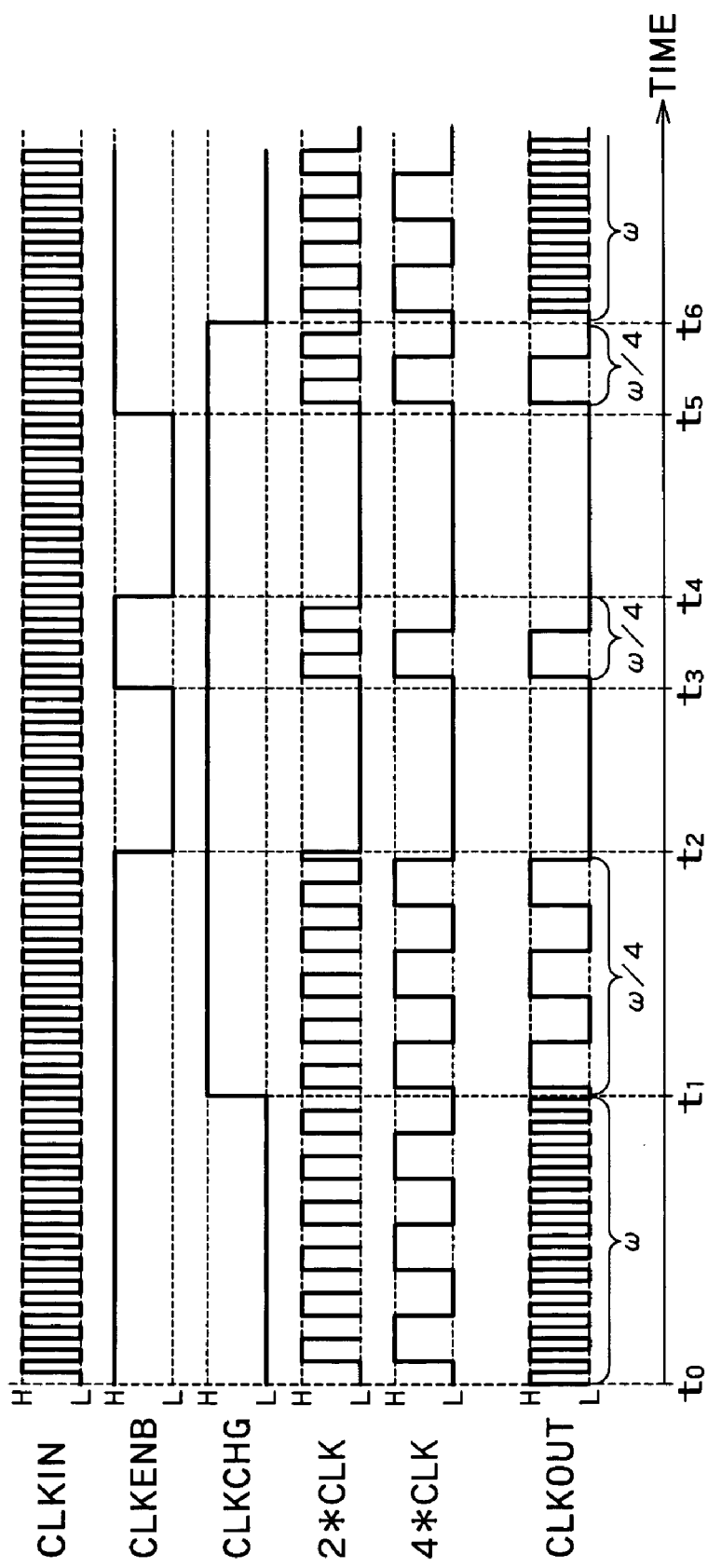
FIG. 11 is a timing chart showing a relationship among a frequency switching signal CLKCHG, an enabling signal CLKENB and a clock output signal CLKOUT.

FIG. 11 is a timing chart showing a relationship among a frequency changing signal CLKCHG, an enabling signal CLKENB and a clock output signal CLKOUT. When the enabling signal CLKENB is High and the frequency changing signal CLKCHG is Low (time points $t_0$ to $t_1$), the frequency changing circuit 220 outputs the clock input signal CLKIN as a clock output signal CLKOUT. When both the enabling signal CLKENB and the frequency changing signal CLKCHG are High (time points $t_1$ to $t_2$), the frequency changing circuit 220 outputs the clock signal 4*CLK as the clock output signal CLKOUT. When the enabling signal CLKENB becomes Low (time points $t_2$ to $t_3$), the frequency changing circuit 220 interrupts the clock input signal CLKIN and the clock signal 4*CLK. Operations of the frequency changing circuit 220 during time points $t_3$ to $t_4$ and time points $t_5$ to $t_6$ are similar to the operation of the frequency changing circuit 220 during the time points $t_1$ to $t_2$. Operations of the frequency changing circuit 220 during time points $t_4$ to $t_5$ and during time point $t_6$ to time point subsequent thereto are similar to the operations of the frequency changing circuit 220 during the time points $t_2$ to $t_3$ and during the time points $t_0$ to $t_1$.

Figure 12:
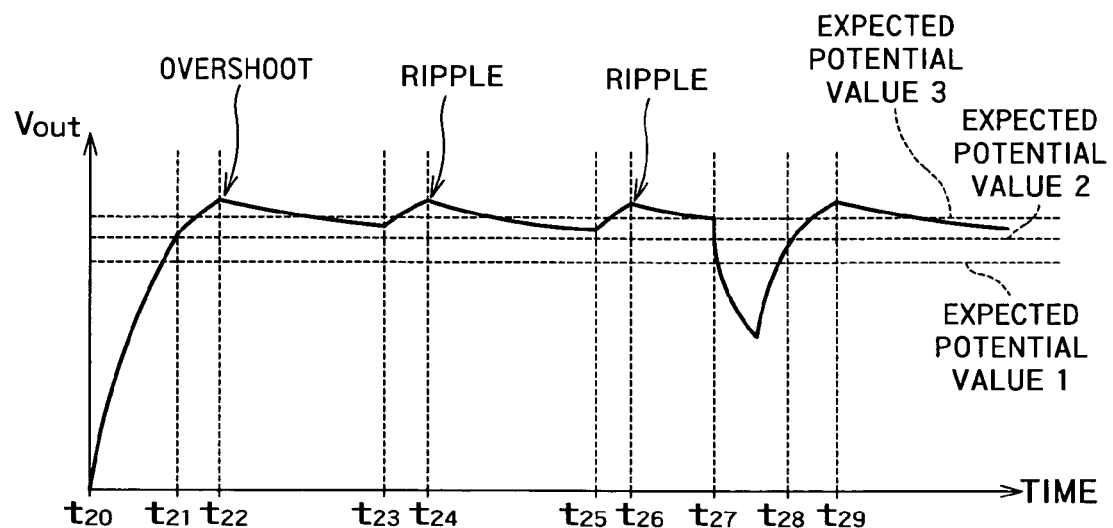
FIG. 12 is a graph showing an output potential Vout of the second embodiment.
Figure 13:
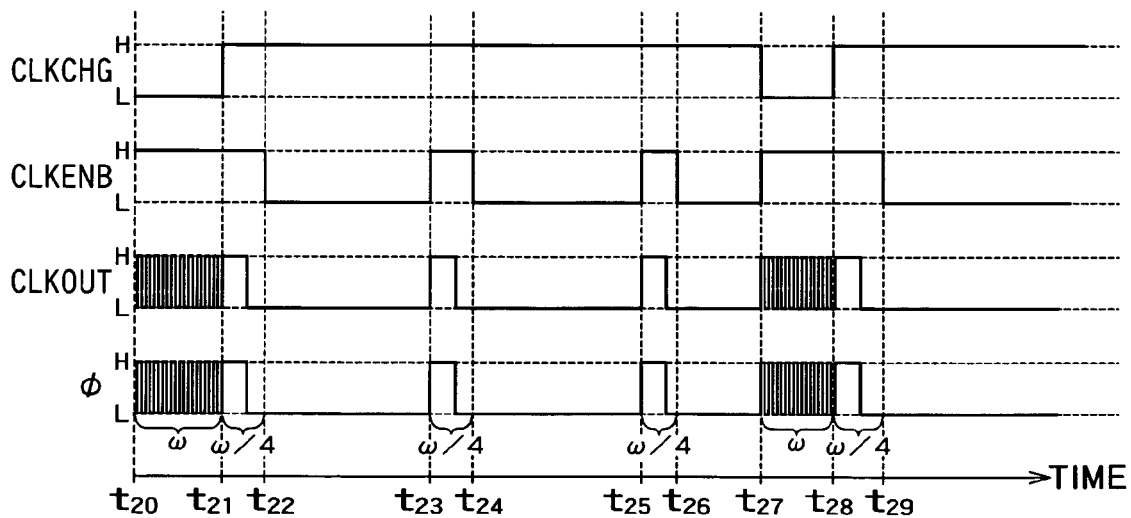
FIG. 13 is a timing chart showing a relationship among a frequency switching signal CLKCHG, an enabling signal CLKENB, a clock output signal CLKOUT and a clock signal Φ.

FIG. 12 is a graph showing an output potential Vout of this embodiment. FIG. 13 is a timing chart showing a relationship among a frequency changing signal CLKCHG, an enabling signal CLKENB, a clock output signal CLKOUT and clock signal Φ. Incidentally, since the clock input signal CLKIN and the clock signal 4*CLK are a signal with a fixed frequency of w and a signal with a fixed frequency of w/4, they will be omitted in FIG. 13.

An output potential Vout obtained when the monitor potential MON1 is equal to the reference potential is defined as an expected potential value 1, an output potential Vout obtained when the monitor potential MON2 is equal to the reference potential is defined as an expected potential value 2, and an output potential Vout obtained when the monitor potential MON3 is equal to the reference potential is defined as an expected potential value 3. As explained with reference to FIG. 9, when the output potential Vout is boosted, the monitor potentials MON1, MON2 and MON3 exceed the reference potential Vref in this order, so that the potential of the expected potential value 3 is the highest and the expected potential values lower in the order of the expected potential values 2 and the expected potential value 1.

With reference to FIG. 12 and FIG. 13, an operation and an advantage of the semiconductor device 200 shown in FIG. 9 will be explained. Incidentally, this embodiment serves to hold the output potential Vout in the expected potential value 3. When the booster circuit 112 first starts an boosting operation, the output potential Vout rise from zero (during time points $t_{20}$ to $t_{21}$). At this time, the monitor potentials MON1 to MON3 are lower than the reference potential Vref. Alternatively, only the monitor potential MON1 exceeds the reference potential Vref. Therefore, all the flag signals FLG1 to FLG3 become High or only the flag signal FLG1 becomes Low. At this time, the frequency changing signal is inactive (Low) and the enabling signal CLKENB is active (High). Therefore, frequency changing circuit 220 outputs the clock input signal CLKIN as the clock output signal CLKOUT without changing the frequency w of the clock input signal CLKIN. The clock output signal CLKOUT and a reversed signal thereof become clock signals Φ and Φbar. Thereby, the booster circuit 112 can boost the output voltage Vout in a short time with its high boosting ability.

Next, when the output potential Vout exceeds the expected potential value 2 (time point $t_{21}$), the monitor potentials MON1 and MON2 exceed the reference potential Vref, while the monitor potential MON3 remains lower than the reference potential Vref. Therefore, the frequency changing signal CLKCHG is latched in an active (High) state and the enabling signal CLKENB holds its active (High) state. Therefore, the frequency changing circuit 220 outputs the clock signal 4*CLK with the frequency w/4 as the clock output signal CLKOUT. The clock signal 4*CLK and its reversed signal become clock signals Φ and Φbar. Therefore, the boosting ability of the booster circuit 112 lowers to ¼ to the clock signals Φ and Φbar with the frequency w.

Next, when the output potential Vout exceeds the expected potential value 3 (time point $t_{22}$), the monitor potential MON3 exceeds the reference potential Vref. Therefore, the enabling signal CLKENB becomes inactive (Low). Therefore, the frequency changing circuit 220 interrupts the clock output signal CLKOUT. Thereby, the clock signals Φ and Φbar become Low. That is, the boosting operation of the booster circuit 112 stops and the output voltage Vout gradually lowers due to a current $I_R$.

When the output potential Vout lowers below the expected potential value 3 (time point $t_{23}$), the monitor potential MON3 lowers below the reference potential Vref. Therefore, the enabling signal CLKENB becomes active (High). At this time, the frequency changing signal CLKCHG is latched in an active (High) state by the latch circuit 215. Therefore, the frequency changing circuit 120 outputs the clock signal 4*CLK with the frequency w/4 as a clock signal Φ or Φbar. Thus, the booster circuit 112 restarts its boosting operation. However, since the frequency of the clock signal Φ or Φbar is w/4, the boosting ability is about ¼ to the clock signal Φ or Φbar with the frequency w. In this connection, since the current $I_R$ is very small, a lowering speed of the output potential Vout is slow. Thereby, undershoot becomes smaller than overshoot. Accordingly, the output potential Vout does not lower below the expected potential value 1 and it can be held in the expected potential value 3.

Therefore, when the output potential Vout exceeds the expected potential value 3 (time point $t_{24}$), the semiconductor device 200 performs the same operation as the operation at the time point $t_{22}$. An operation of the semiconductor device 200 during the time points $t_{25}$ to $t_{26}$ is the same at the operation of the semiconductor device 200 during the time points $t_{23}$ to $t_{24}$.

Further, when an output of the booster circuit 112 is connected with a new load (time point $t_{27}$), such a possibility may occur that the output voltage Vout lowers urgently. In such a case, since the output voltage Vout lowers below the expected value voltage (potential) 1, the latch circuit 215 is reset, and the booster circuit 112 is driven by the clock signal Φ or Φbar with the frequency w like the case during time points $t_{20}$ to $t_{21}$. Thereby, the booster circuit 112 can boost the output voltage Vout in a short time. An operation of the semiconductor device 200 during the time points $t_{28}$ to $t_{29}$ is the same as the operation of the semiconductor device during the time points $t_{21}$ to $t_{22}$.

This embodiment has an advantage or merit similar to the first embodiment. Further, this embodiment has the latch circuit 215, where three expected potential values have been set. Thereby, the output potential Vout can be boosted with a high boosting ability until the output potential Vout is boosted up to the expected potential value 2 approximating to the expected potential value 3. On the other hand, even if the output potential Vout lowers below the expected potential value 2, the frequencies of the clock signals Φ and Φbar are held in the frequency w/4 by operation of the latch circuit 215. Unless the output potential Vout lowers below the expected potential value 1 lower than the expected potential value 2, the frequencies do not return back to the frequency w. That is, it is made possible to boost the output potential Vout with a high boosting ability just before the expected potential value 3 by causing the expected potential value 2 to approach to the expected potential value 3 sufficiently. In addition thereto, when the output potential Vout is held at the expected potential value 3, the frequencies of the clock signals Φ and Φbar with the frequency w/4 are w/4 and they are not reset to w, so that the output potential Vout is not boosted with an excessive boosting ability. As a result, this embodiment can boosts the output potential Vout in an initial stage of boosting very quickly, and a ripple may be made small.

In this embodiment, the frequency changing circuit 220 frequency-divides the frequency w of the clock input signal CLKIN to ¼. However, the frequency changing circuit 220 shown in FIG. 10 is merely one specific example, and the frequency changing circuit 220 may frequency-divide the clock input signal CLKIN to n/m. Incidentally n and m are natural numbers, where n<m.

In order to adjust the expected potential value 1, the expected potential value 2 and the expected potential value 3, values of the resistors R10, R20, R30 and R40 may be changed. Thereby, the values of the expected potential value 1, the expected potential value 2 and the expected potential value 3 can be fitted to their specifications. The expected potential value 2 is not limited to a specific value as long as it is equal to or less than the expected value 3. In this connection, it is preferable that the expected potential value 2 further approximates to the expected potential value 3 for holding a fast boosting speed. Further, the expected potential value 1 is not limited to a specific value as long as it is equal to or less than the expected potential value 2. In this connection, it is preferable that, when the output potential Vout is held in a value approximating to the expected potential value 3, the output potential Vout is set such that it does not lower below the expected potential value 1 for preventing the output potential Vout from being boosted with an excessive boosting ability.

THIRD EMBODIMENT

A block diagram of a boosting section of a semiconductor device 300 according to a third embodiment is similar to that in FIG. 1. Incidentally, in this embodiment, a regulator circuit 313 is provided in place of the regulator circuit 313.

Figure 14:
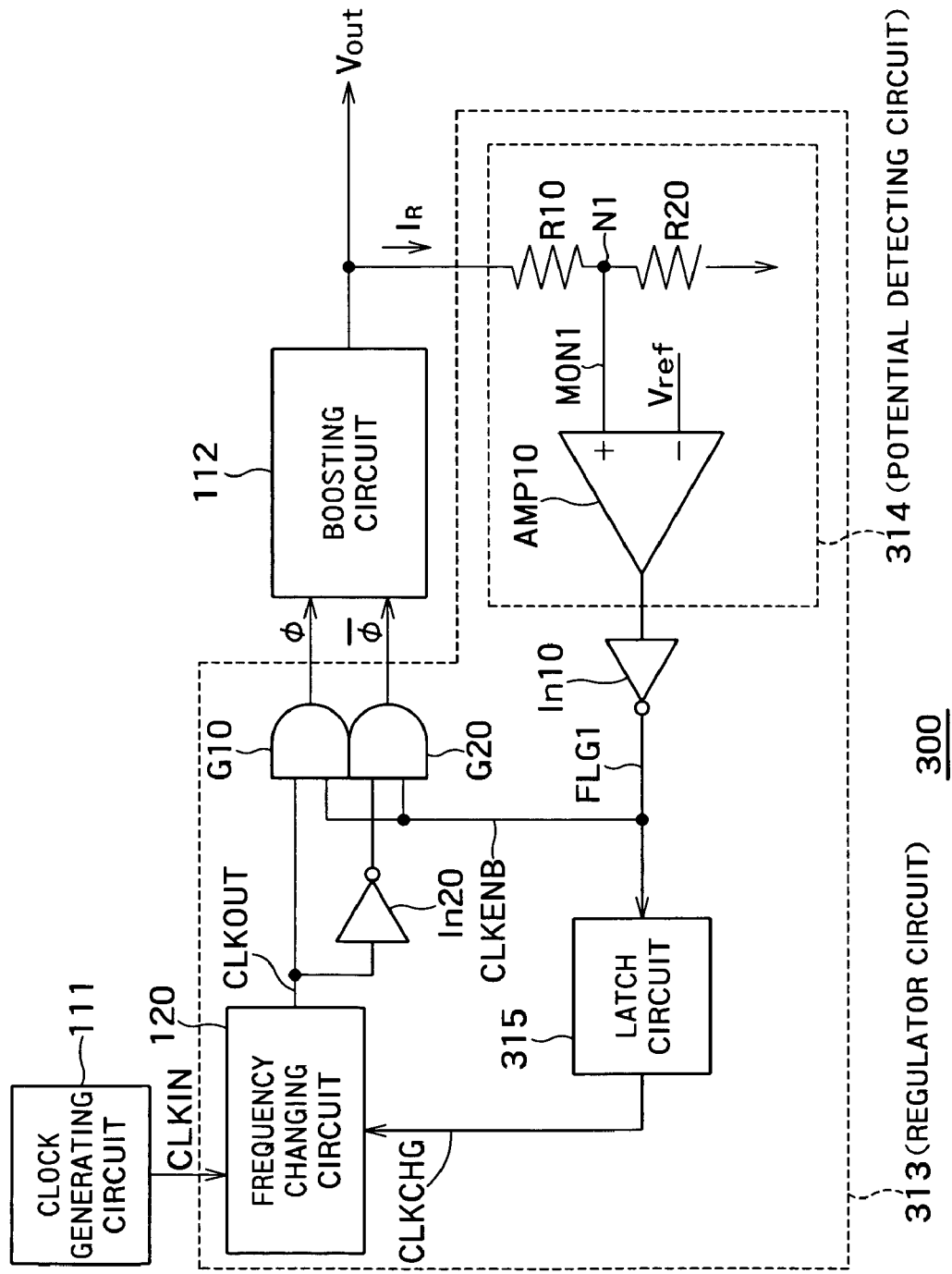
FIG. 14 is a circuit diagram showing a clock generating circuit 111, one of booster circuits 112 and one of regulator circuits 313 according to a third embodiment.

FIG. 14 is a circuit diagram of a clock generating circuit 111, one of booster circuits 112 and one of regulator circuits 313. The regulator circuit 313 is different from the regulator circuit 113 in that the former is provided with one differential amplifier and it includes a latch circuit 315.

Resistors R10 and R20 is connected in series between an output of the booting circuit 112 and the ground GND. The resistors R10 and R20 potential-divide an output potential Vout to produce a monitor potential MON1 from a node N1 between the resistor R10 and the resistor R20. Since the monitor potential MON1 changes in proportion to the output potential Vout, the output potential Vout can be monitored.

One input of a differential amplifier AMP10 is connected to the node N1, and the other input thereof is connected to the reference potential Vref. An output of the differential amplifier AMP10 is connected with an inverter In10.

The differential amplifier AMP10 compares the monitor potential MON1 and the reference potential Vref to each other to output a signal on the basis of the comparison result. The inverter In10 reverses an output of the differential amplifier AMP10 to output the same as a flag signal FLG1.

In details, when the monitor potential MON1 is lower than the reference potential Vref, the flag signal FLG1 becomes High. When the monitor potential MON1 exceeds the reference potential Vref, the flag signal FLG1 becomes Low.

The flag signal FLG1 is supplied to the latch circuit 315, and AND gates G10 and G20. The latch circuit 315 outputs a frequency changing signal CLKCHG on the basis of the flag signal FLG1. In this embodiment, after the flag signal FLF1 has been once changed to Low, the frequency changing signal CLKCHG is always latched in a active (High) state. Thereafter, even if the flag signal FLG1 is changed to High, the state of the frequency changing signal CLKCHG does not change.

Operations of the frequency changing circuit 120 and the AND gates G10 and G20 to the flag signal FLG1 will be explained. When the flag signal FLG1 is High, the enabling signal CLKENB is active (High) and the frequency changing signal CLKCHG is inactive (Low). Therefore, the frequency changing circuit 120 outputs a clock output signal CLKOUT with a frequency w, and the AND gates G10 and G20 cause the clock output signal CLKOUT and its reversed signal to pass through as clock signals Φ and Φbar.

When the flag signal FLG1 becomes Low, the enabling signal CLKENB becomes inactive (Low) and the latch circuit 315 latches the frequency changing signal CLKCHG in an active (High) state. Thereby, the frequency changing circuit 120 outputs a clock output signal CLKOUT with a frequency of w/2, and the AND gates G10 and G20 interrupt the clock output signals CLKOUT.

When the flag signal FLG1 becomes High again, the enabling signal CLKENB becomes active (High), but the frequency changing signal CLKCHG is held at an active (High) state by the latch circuit 315. Thereby, the frequency changing circuit 120 outputs the clock output signal CLKOUT with the frequency of w/2, and the AND gates G10 and G20 allows the clock output signal CLKOUT and its reversed signal to pass as the clock signals Φ and Φbar, respectively.

Figure 15:
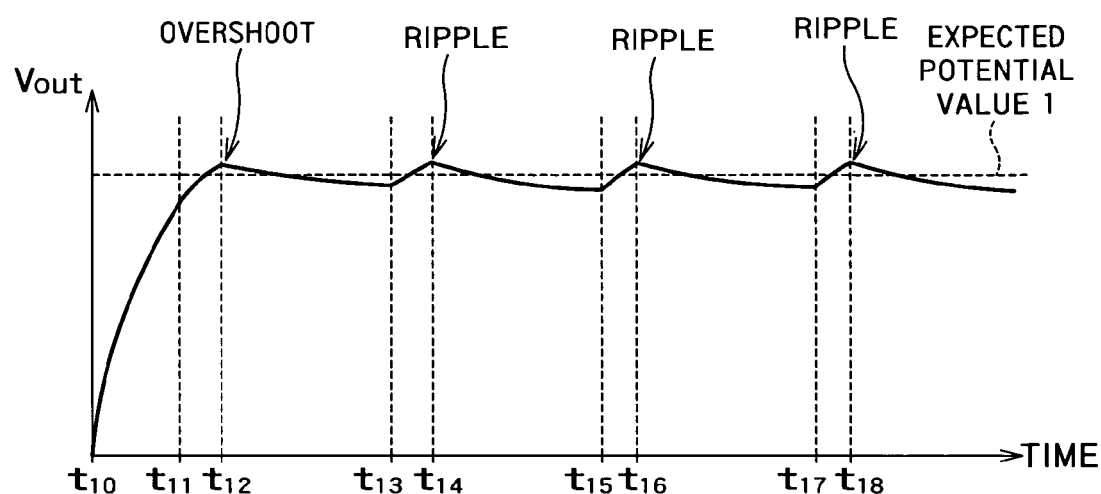
FIG. 15 is a graph showing an output potential Vout of the third embodiment.
Figure 16:
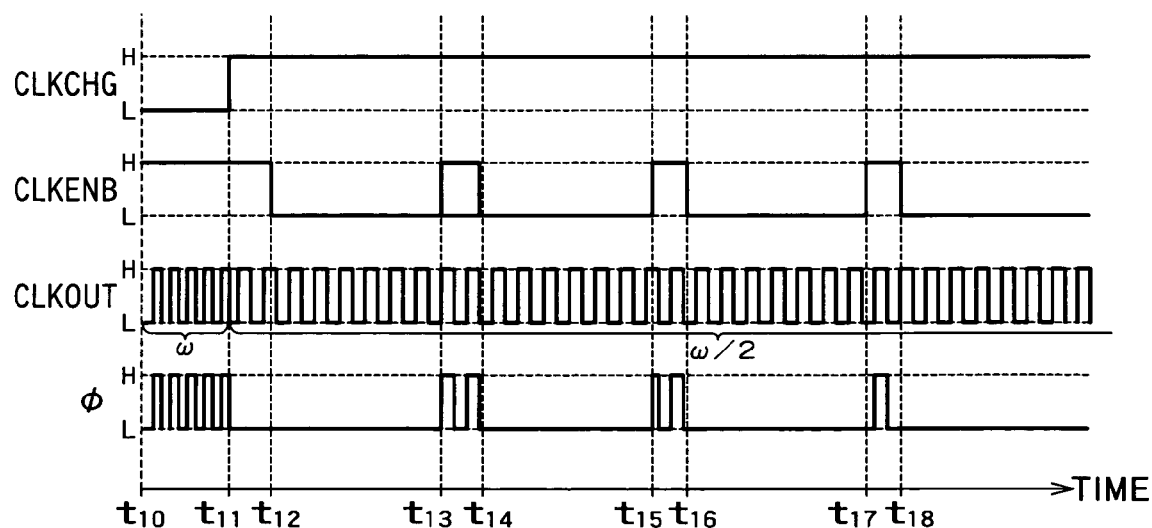
FIG. 16 is a timing chart showing a relationship among a frequency changing signal CLKCHG, an enabling signal CLKENB, a clock output signal CLKOUT and a clock signal Φ.

FIG. 15 is a graph showing an output potential Vout in this embodiment. FIG. 16 is a timing chart showing a relationship among a frequency changing signal CLKCHG, an enabling signal CLKENB, a clock output signal CLKOUT and a clock signal Φ. The output potential Vout obtained when the monitor potential MON1 is equal to the reference potential is defined as an expected potential value 1. The semiconductor device 300 serves to hold the output potential Vout in the expected potential value 1.

With reference to FIG. 15 and FIG. 16, an operation and an advantage of the semiconductor device 300 will be explained. First, when the booster circuit 112 starts a boosting operation, the output potential Vout is boosted (time points $t_{30}$ to $t_{31}$). At this time, the monitor potential MON1 is smaller than the reference potential Vref, so that the frequency changing signal CLKCHG is inactive (Low) and the enabling signal CLKENG is active (High). Therefore, the frequency changing circuit 120 outputs the clock input signal CLKIN as a clock output signal CLKOUT without changing the frequency w of the clock input signal CLKIN. Further, the AND gates G10 and G20 output the clock output signals CLKOUT as the clock signal Φ or Φbar. Thereby, the booster circuit 112 can boost a supply voltage in a short time.

Next, when the output potential Vout exceeds the expected potential value 1 (time point $t_{31}$), the monitor potential MON1 exceeds the reference potential Vref. Therefore, the latch circuit 315 latches the frequency changing signal CLKCHG in an active (High) state and the enabling signal CLKENB becomes inactive (Low). Thereby, the frequency changing circuit 120 frequency-divides the frequency of the clock input signal CLKIN to w/2, but the AND gates G10 and G20 interrupt the clock output signals CLKOUT with the frequency w/2. Accordingly, the booster circuit 112 stops its boosting operation and the output potential Vout gradually lowers due to a current $I_R$.

Next, when the output potential Vout lowers below the expected potential value 1 (time point $t_{33}$), the monitor potential MON1 lowers below the reference potential Vref. Thereby, the enabling signal CLKENB becomes active (High). At this time, the frequency changing signal CLKCHG is held in an active (High) state by the latch circuit 315. Thereby, the frequency changing circuit 120 outputs the clock output signal CLKOUT with the frequency w/2, and the AND gates G10 and G20 outputs the clock output signals CLKOUT with the frequency w/2 as the clock signal Φ or Φbar. Accordingly, the booster circuit 112 restarts its boosting operation. However, since the frequency of the clock signal Φ or Φbar is w/2, its boosting ability is about one half to the boosting ability by the clock signal Φ or Φbar.

Thereafter, when the output potential Vout exceeds the expected potential value 1 (time point $t_{34}$), this embodiment performs the same operation as at the time point $t_{32}$. The operations of the semiconductor device 300 at the time points of $t_{33}$ and $t_{34}$ are repeated at the time points $t_{35}$, $t_{36}$ and time points $t_{37}$, $t_{38}$. Thereby, the semiconductor device 300 serves to hold the output potential Vout in the expected potential value 1.

This embodiment has an advantage or merit similar to the first embodiment. However, when the output of the booster circuit 112 is connected with a new load, there may occurs a possibility that the output potential Vout lowers rapidly. In such a case, since the frequency changing signal CLKCHG is remained in an active (High) state by the latch circuit 315, the booster circuit 112 performs a boosting operation by the clock signal Φ or Φbar with the frequency w/2. Therefore, a time elapsed until the output potential Vout returns back to the expected potential value 1 becomes longer than a time elapsed in the case that boosting is performed by the clock signal Φ or Φbar. Accordingly, this embodiment is unsuitable for a case that, after the output potential Vout has reached the expected potential value 1, the output of the booster circuit 112 is connected with a new load. However, since the circuit configuration of the semiconductor device 300 is simpler than the circuit configuration of the semiconductor device 100, the size of the apparatus can be further reduced.

Figure 17:
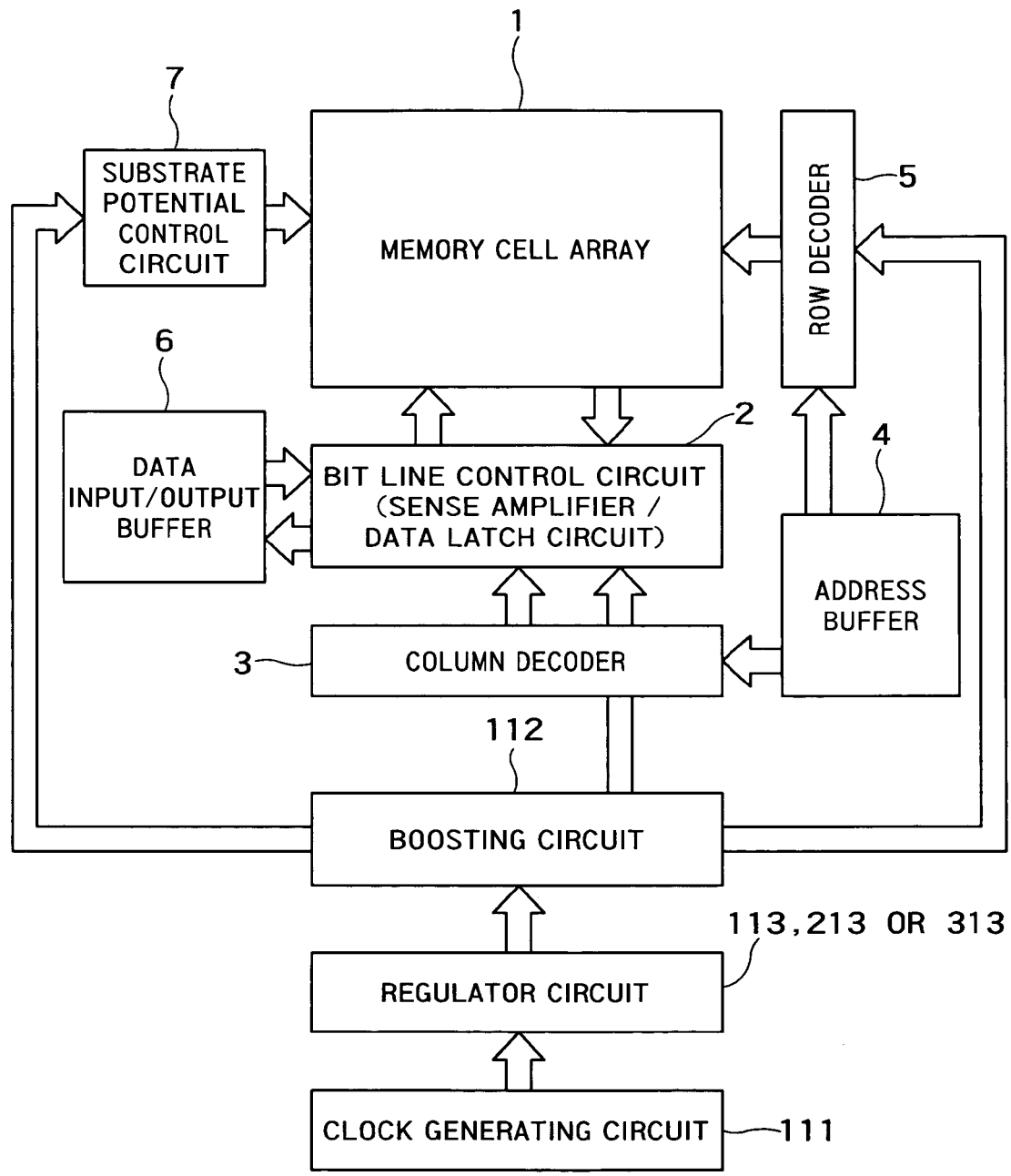
FIG. 17 is a block diagram of a semiconductor memory device 400 according to an embodiment of the present invention.
Figure 18:
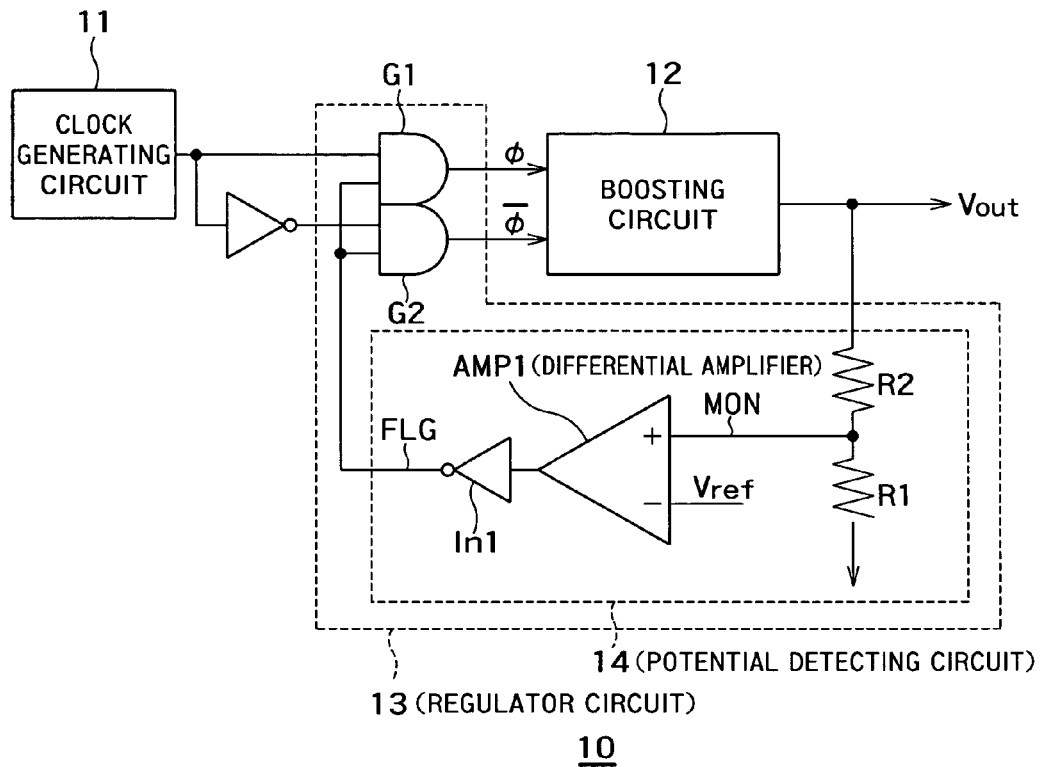
FIG. 18 is a block diagram of a boosted potential generating section of a conventional semiconductor memory device 10.
Figure 19:
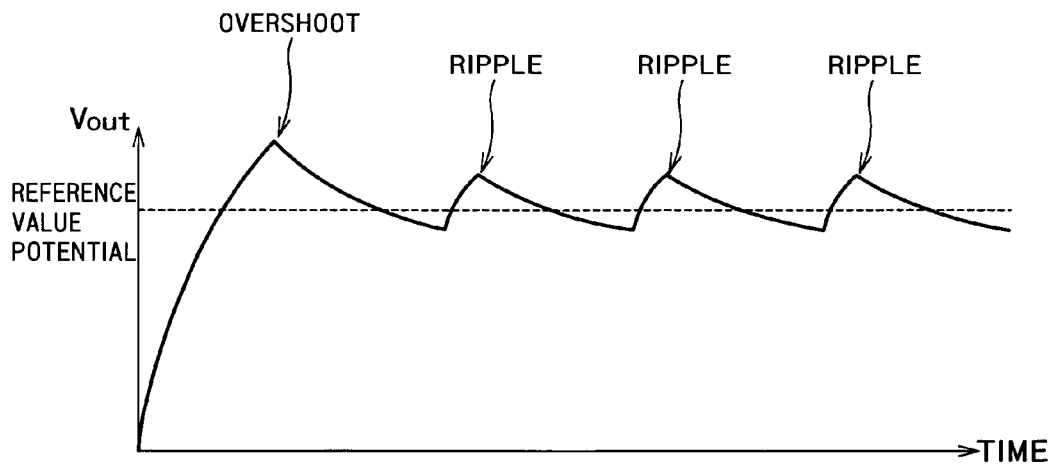
FIG. 19 is a graph of an output potential Vout in the boosted potential generating section of a conventional semiconductor device.

FIG. 17 is a block diagram of a semiconductor device 400 according to an embodiment of the present invention. The semiconductor device 400 may be, for example, a NAND type EEPROM or a NAND type flash memory.

A bit line control circuit 2 for performing writing/reading of data in the memory cell array 1 as the memory means is provided. The bit line control circuit 2 are connected to a data input buffer 6 and receives an output of a column decoder 3 receiving an address signal from an address buffer 4 as an input. Further, a row decoder 5 is provided for controlling a control gate and a selection gate to the memory cell array 1, and a substrate potential control circuit 7 for controlling a potential of a p-type substrate (or a p-type well) on which the memory cell array 1 is formed is provided.

Further, the semiconductor device 400 is provided with a clock generating circuit 111, a regulator circuit and a booster circuit 112. The regulator circuit may be either one of the regulator circuits 113, 213 and 313 in the first to third embodiments. The booster circuit 112 supplies an output voltage Vout to the bit line control circuit 2, the row decoder 5 and the substrate potential control circuit 7 at reading/writing/erasing times of the memory cell array 1. The booster circuit 112 can supply a stable output potential Vout with reduced overshoot or ripple by the regulator circuit 113.

The invention claimed is:

1. A semiconductor device comprising:
a clock generator which generates a clock signal;
a booster which boosts a supply voltage by using the clock signal to output an output potential of the booster;
a potential detector which detects the output potential of the booster to output a frequency changing signal depending on the output potential of the booster; and
a frequency changer which is interposed between the clock generator and the booster to change a frequency of the clock signal from the clock generator to the booster on the basis of the frequency changing signal, wherein
the potential detector includes:
a voltage-divider which voltage-divides the output potential of the booster to produce a first potential and a second potential which is not more than the first potential,
a first comparator which compares the first potential with a reference potential to output the frequency changing signal on the basis of the comparison result, and
a second comparator which compares the second potential with the reference potential to output an enabling signal on the basis of the comparison result, said enabling signal determining whether or not the clock signal is caused to pass to the booster from the frequency changer,
wherein the semiconductor device further comprises a gate circuit which is interposed between the frequency changer and the booster to cause the clock signal to pass to the booster from the frequency changer or to interrupt the clock signal on the basis of the enabling signal.

2. A semiconductor device according to claim 1, wherein
the first comparator activates the frequency changing signal when the first potential exceeds the reference potential,
the frequency changer decreases a frequency of the clock signal in a case that the frequency changing signal is active,
the second comparator deactivates the enable signal when the second potential exceeds the reference potential, and
the gate circuit interrupts the clock signal from the frequency changer to the booster in a case that the enable signal is inactive.

3. A semiconductor device according to claim 1, wherein
the first comparator deactivates the frequency changing signal when the first potential falls below the reference potential,
the frequency changer does not change a frequency of the clock signal in a case that the frequency changing signal is inactive,
the second comparator activates the enable signal when the second potential falls below the reference potential, and
the gate circuit passes the clock signal from the frequency changer to the booster in a case that the enable signal is active.

4. The semiconductor device according to claim 1, wherein
a plurality of boosters including the booster are provided for the one clock generator, the boosters receiving the clock signal from the clock generator in parallel with each other,
potential detectors and frequency changers are provided for each of the boosters,
each potential detector detects an output potential of the corresponding booster, and
each frequency changer changes the frequency of the clock signal fed from the clock generator to the booster corresponding to each frequency changer on the basis of the frequency changing signal supplied from the potential detector corresponding to each frequency changer.

5. A semiconductor device comprising:
a clock generator which generates a clock signal;
a booster which boosts a supply voltage by using the clock signal to output an output potential of the booster;
a potential detector which detects the output potential of the booster to output a frequency changing signal depending on the output potential of the booster; and
a frequency changer which is interposed between the clock generator and the booster to change a frequency of the clock signal from the clock generator to the booster on the basis of the frequency changing signal, wherein
the potential detector further includes:
a voltage-divider which voltage-divides the output potential of the booster to produce a first potential, a second potential and a third potential,
a first comparator which compares the first potential with a reference potential to output a first comparison result signal on the basis of the comparison result of the first comparator,
a second comparator which compares the second potential with the reference potential to output a second comparison result signal on the basis of the comparison result of the second comparator,
a third comparator which compares the third potential with the reference potential to output an enabling signal on the basis of the comparison result of the third comparator, said enabling signal determining whether or not the clock signal is caused to pass to the booster from the frequency changer, and a latch which latches and outputs the frequency changing signal on the basis of the first and the second comparison result signals, wherein the semiconductor device further comprises a gate circuit which passes or interrupts the clock signal from the clock generator to the booster on the basis of the enabling signal.

6. A semiconductor device according to claim 5, wherein the second potential is not more than the first potential, and the third potential is not more than the second potential, the first comparator activates the first comparison result signal when the first potential exceeds the reference potential, the second comparator activates the second comparison result signal when the second potential exceeds the reference potential, the latch latches the frequency changing signal in an active state when both of the first and the second comparison result signals are active, the frequency changer decreases a frequency of the clock signal when the frequency changing signal is active, the third comparator deactivates the enable signal when the third potential exceeds the reference potential, and the gate circuit interrupts the clock signal from the frequency changer to the booster in a case that the enable signal is inactive.

7. A semiconductor device according to claim 5, wherein the gate circuit is embedded in the frequency changer.

8. A semiconductor device according to claim 5, wherein the second potential is not more than the first potential, and the third potential is not more than the second potential, the first comparator deactivates the first comparison result signal when the first potential falls below the reference potential, the second comparator deactivates the second comparison result signal when the second potential falls below the reference potential, the latch resets the frequency changing signal to an inactive state when both of the first and the second comparison result signals are inactive, the frequency changer does not changes a frequency of the clock signal when the frequency changing signal is inactive, the third comparator activates the enable signal when the third potential falls below the reference potential, and the gate circuit passes the clock signal from the frequency changer to the booster in a case that the enable signal is active.

9. The semiconductor device according to claim 5, wherein a plurality of boosters including the booster are provided for the one clock generator, the boosters receiving the clock signal from the clock generator in parallel with each other, potential detectors and frequency changers are provided for each of the boosters, each potential detector detects an output potential of the corresponding booster, and each frequency changer changes the frequency of the clock signal fed from the clock generator to the booster corresponding to each frequency changer on the basis of the frequency changing signal supplied from the potential detector corresponding to each frequency changer.

10. A semiconductor device comprising:

a clock generator which generates a clock signal;

a booster which boosts a supply voltage by using the clock signal to output an output potential of the booster;

a potential detector which detects the output potential of the booster to output a frequency changing signal depending on the output potential of the booster; and a frequency changer which is interposed between the clock generator and the booster to change a frequency of the clock signal from the clock generator to the booster on the basis of the frequency changing signal, wherein the potential detector includes:

a voltage-divider which voltage-divides the output potential of the booster to produce a first potential, and a comparator which compares the first potential with a reference potential to output a comparison result signal on the basis of the comparison result, wherein the semiconductor device further comprises:

a latch which latches the comparison result signal to output the comparison result signal as the frequency changing signal to the frequency changer, and a gate circuit which is interposed between the frequency changer and the booster to cause the clock signal to pass to the booster from the frequency changer or to interrupt the clock signal on the basis of the comparison result signal.

11. A semiconductor device according to claim 10, wherein the comparator activates the comparison result signal when the first potential exceeds the reference potential, the latch latches the frequency changing signal in an active state on the basis of the comparison result signal, the frequency changing signal decreases a frequency of the clock signal when the frequency changing signal is active, and the gate circuit interrupts the clock signal from the frequency changer to the booster when the comparison result signal is active.

12. A semiconductor device according to claim 10, wherein the comparator deactivates the comparison result signal when the first potential falls below the reference potential, the latch keeps the frequency changing signal in an active state even though the comparison result signal is inactive, the frequency changing signal decreases a frequency of the clock signal when the frequency changing signal is active, and the gate circuit passes the clock signal from the frequency changer to booster when the comparison result signal is inactive.

13. The semiconductor device according to claim 10, wherein a plurality of boosters including the booster are provided for the one clock generator, the boosters receiving the clock signal from the clock generator in parallel with each other, potential detectors and frequency changers are provided for each of the boosters, each potential detector detects an output potential of the corresponding booster, and each frequency changer changes the frequency of the clock signal fed from the clock generator to the booster corresponding to each frequency changer on the basis of the frequency changing signal supplied from the potential detector corresponding to each frequency changer.

14. A driving method of a semiconductor device, said semiconductor device including a clock generator generating a clock signal, a booster boosting a supply voltage using the clock signal to output a boosted output potential, a potential detector detecting the boosted output potential of the booster, a frequency changer interposed between the clock generator and the booster, and a gate circuit intervening between the frequency changer and the booster, comprising:

detecting the boosted output potential of the booster at the potential detector;

generating a frequency changing signal depending on the boosted output potential of the booster at the potential detector;

changing a frequency of the clock signal from the clock generator to the booster on the basis of the frequency changing signal, wherein when detecting the output boosted potential of the booster, voltage-dividing the output boosted potential of the booster to generate a first potential and a second potential which is not greater than the first potential, when changing the frequency of the clock signal, the frequency changer passes the clock signal from the frequency changer to the booster-without changing the frequency of the clock signal when the first and second potentials fall below a reference potential, the frequency changer decreases the frequency of the clock signal and passes the clock signal from the frequency changer to the booster when the first potential exceeds the reference potential and the second potential falls below the reference potential, the gate circuit interrupts the clock signal from the frequency changer to the booster when the first and the second potentials exceed the reference potential, the gate circuit passes the clock signal from the frequency changer to the booster again when the second potential falls below the reference potential again, and the frequency changer gets back the lowered frequency of the clock signal to the original frequency, when the first potential falls below the reference potential again.

15. The driving method of a semiconductor device according to claim 14, wherein a plurality of boosters including the booster are provided for the one clock generator, the boosters receiving the clock signal from the clock generator in parallel with each other, potential detectors and frequency changers are provided for each of the boosters, each potential detector detects an output potential of the corresponding booster, and each frequency changer changes the frequency of the clock signal fed from the clock generator to the booster corresponding to each frequency changer on the basis of the frequency changing signal supplied from the potential detector corresponding to each frequency changer.

16. A driving method of a semiconductor device, said the semiconductor device including a clock generator generating a clock signal, a booster boosting a supply voltage using the clock signal to output a boosted output potential a potential detector detecting the boosted output potential of the booster, a frequency changer interposed between the clock generator and the booster, a latch latching the frequency changing signal to output the same, and a gate circuit intervening between the frequency changer and the booster, comprising:

detecting the output boosted potential of the booster at the potential detector;

generating a frequency changing signal depending on the boosted output potential of the booster at the potential detector; and changing a frequency of the clock signal from the clock generator to the booster on the basis of the frequency changing signal, wherein when detecting the boosted output potential of the booster, voltage-dividing the boosted output potential of the booster to generate a first potential, a second potential which is not higher than the first potential and a third potential which is not higher than the second potential, when changing the frequency of the clock signal, the frequency changer passes the clock signal to the booster-without changing the frequency of the clock signal when the first, the second and the third potentials fall below a reference potential, the latch latches the frequency changing signal, and the frequency changer decreases the frequency of the clock signal and passes the clock signal to the booster when the first and the second potentials exceed the reference potential and the third potential falls below the reference potential, a gate circuit interrupts the clock signal to the booster when the first the, second and the third potentials exceed the reference potential, the gate circuit passes again the clock signal with the decreased frequency to the booster when the first and the second potentials exceed the reference potential, and the third potential falls below the reference potential, and the latch-resets the frequency changing signal, and the frequency changer gets back the lowered frequency of the clock signal to the original frequency, when the first, the second, and the third potentials fall below the reference potential again.

17. The driving method of a semiconductor device according to claim 16, wherein a plurality of boosters including the booster are provided for the one clock generator, the boosters receiving the clock signal from the clock generator in parallel with each other, potential detectors and frequency changers are provided for each of the boosters, each potential detector detects an output potential of the corresponding booster, and each frequency changer changes the frequency of the clock signal fed from the clock generator to the booster corresponding to each frequency changer on the basis of the frequency changing signal supplied from the potential detector corresponding to each frequency changer.

18. A driving method of a semiconductor device, said semiconductor device including a clock generator generating a clock signal, a booster boosting a supply voltage using the clock signal to output a boosted output potential, a potential detector detecting the boosted output a frequency changer interposed between the clock generator and the booster, a latch latching the frequency changing signal to output the same, and a gate circuit intervening between the frequency changer and the booster, comprising:

detecting the boosted output potential of the booster at the potential detector;

generating a frequency changing signal depending on the boosted output potential of the booster at the potential detector;

changing a frequency of the clock signal from the clock generator to the booster on the basis of the frequency changing signal, wherein when detecting the boosted output potential of the booster, voltage-dividing the boosted output potential of the booster to generate a first potential, when changing the frequency of the clock signal, the frequency changer does not change the frequency of the clock signal when the first potential falls below a reference potential, the latch latches the frequency changing signal, and the frequency changer lowers the frequency of the clock signal and the gate circuit interrupts the clock signal to the booster when the first potential exceeds the reference potential, and the latch maintains the frequency changing signal, and the frequency changer does not change a state of the decreased frequency of the clock signal, and the gate circuit passes the clock signal to the booster when the first potential falls below the reference potential again.

19. The driving method of a semiconductor device according to claim 18, wherein a plurality of boosters including the booster are provided for the one clock generator, the boosters receiving the clock signal from the clock generator in parallel with each other, potential detectors and frequency changers are provided for each of the boosters, each potential detector detects an output potential of the corresponding booster, and each frequency changer changes the frequency of the clock signal fed from the clock generator to the booster corresponding to each frequency changer on the basis of the frequency changing signal supplied from the potential detector corresponding to each frequency changer.

* * * * *